United States Patent
Padalino et al.

(10) Patent No.: US 9,881,285 B1
(45) Date of Patent: Jan. 30, 2018

(54) SYSTEM AND METHOD FOR AUTOMATED DEBITING AND SETTLING OF FINANCIAL TRANSACTIONS

(71) Applicant: CITICORP CREDIT SERVICES, INC. (USA), Long Island City, NY (US)

(72) Inventors: Ronald Padalino, Westlake Village, CA (US); Nigel Pinnell, Santa Monica, CA (US); Philip C. Shinn, Los Angeles, CA (US); Wigberto Yu, Los Angeles, CA (US)

(73) Assignee: Citicorp Credit Services, Inc. (USA), Long Island City, NY (US)

( * ) Notice: Subject to any disclaimer, the term of this patent is extended or adjusted under 35 U.S.C. 154(b) by 499 days.

(21) Appl. No.: 14/171,160

(22) Filed: Feb. 3, 2014

Related U.S. Application Data

(63) Continuation of application No. 12/081,493, filed on Apr. 16, 2008, now Pat. No. 8,650,122, which is a continuation of application No. 09/387,381, filed on Sep. 2, 1999, now Pat. No. 7,376,622.

(60) Provisional application No. 60/098,995, filed on Sep. 2, 1998.

(51) Int. Cl.
   *G06Q 20/10* (2012.01)

(52) U.S. Cl.
   CPC .................................. *G06Q 20/108* (2013.01)

(58) Field of Classification Search
   CPC .................................................... G06Q 20/381
   USPC ............................................................ 705/42
   See application file for complete search history.

(56) References Cited

U.S. PATENT DOCUMENTS

| | | |
|---|---|---|
| 5,136,633 A | 8/1992 | Tejada et al. |
| 5,416,830 A | 5/1995 | MacMillan, Jr. et al. |
| 5,440,615 A | 8/1995 | Caccuro et al. |
| 5,457,305 A | 10/1995 | Akel et al. |
| 5,592,538 A | 1/1997 | Kosowsky et al. |
| 5,650,604 A | 7/1997 | Marcous et al. |
| 5,659,165 A * | 8/1997 | Jennings ................ G06Q 20/04 235/379 |
| 5,771,276 A | 6/1998 | Wolf |

(Continued)

OTHER PUBLICATIONS

EP 0 984 411 A3, Search Report for European Patent Application No. 99202841.5. dated Jan. 31, 2003.

(Continued)

*Primary Examiner* — Jessica Lemieux
(74) *Attorney, Agent, or Firm* — Eric L. Sophir; Dentons US LLP

(57) ABSTRACT

A method and system for automated settlement and on-line debiting of a financial transaction, such as an emergency-cash transaction, is provided. A bank customer enters a foreign-branch bank and indicates a need for emergency cash. The customer is given a telephone by which the customer communicates with an interactive-voice response system in the customer's language. The system bridges the customer with the customer's home bank, which approves the requested emergency cash. A network in communication with the voice response system and with the issuer automatically initiates an on-line debiting of an account of the customer. The network also initiates and carries out settlement between the acquirer and the issuer by way of settlement accounts.

11 Claims, 25 Drawing Sheets

(56) References Cited

U.S. PATENT DOCUMENTS

| | | | |
|---|---|---|---|
| 5,794,218 A * | 8/1998 | Jennings | G06Q 40/00 704/8 |
| 5,850,429 A | 12/1998 | Joyce et al. | |
| 5,905,774 A | 5/1999 | Tatchell et al. | |
| 5,915,001 A | 6/1999 | Uppaluru | |
| 6,119,084 A * | 9/2000 | Roberts | G10L 17/20 704/243 |
| 6,189,785 B1 | 2/2001 | Lowery | |
| 6,236,972 B1 | 5/2001 | Shkedy | |
| 7,376,622 B1 | 5/2008 | Padalino et al. | |
| 8,650,122 B2 | 2/2014 | Padalino et al. | |
| 2003/0120936 A1 | 6/2003 | Farris et al. | |
| 2008/0195539 A1 | 8/2008 | Padalino et al. | |

OTHER PUBLICATIONS

John Downes and Jordan Goodman, "Dictionary of Finance and Investment Terms," Barron's, 1998, p. 559.

"Top 25 Technology Deals of the Year," American Banker, vol. 102, Issue 229, Dec. 1997, p. 51.

McDougall, B., "Electronic Evolution," Canadian Banker, vol. 102, Issue 5, Sep./Oct. 1995, p. 28.

Thacker, K. and Bernstein, R., "Does Home Banking Have a Future?," Canadian Banker, vol. 97, Issue 3, May/Jun. 1990, p. 44.

Klein, E., "More institutions heed the call of telephone banking," Savings Institutions, vol. 113, Issue 11, Nov. 1992, p. 45.

United States Notice of Allowance issued in U.S. Appl. No. 09/387,381 dated Nov. 8, 2008.

United States Final Office Action issued in U.S. Appl. No. 09/387,381 dated Dec. 4, 2002.

United States Non-Final Office Action issued in U.S. Appl. No. 09/387,381 dated Mar. 27, 2002.

United States Non-Final Office Action issued in U.S. Appl. No. 09/387,381 dated Jul. 3, 2001.

United States Notice of Allowance issued in U.S. Appl. No. 12/081,493 dated Oct. 4, 2013.

United States Non-Final Office Action issued in U.S. Appl. No. 12/081,493 dated Apr. 26, 2013.

United States Non-Final Office Action issued in U.S. Appl. No. 12/081,493 dated Nov. 29, 2012.

United States Final Office Action issued in U.S. Appl. No. 12/081,493 dated Feb. 17, 2010.

United States Non-Final Office Action issued in U.S. Appl. No. 12/081,493 dated Aug. 25, 2009.

United States Non-Final Office Action issued in U.S. Appl. No. 12/081,493 dated Mar. 3, 2009.

\* cited by examiner

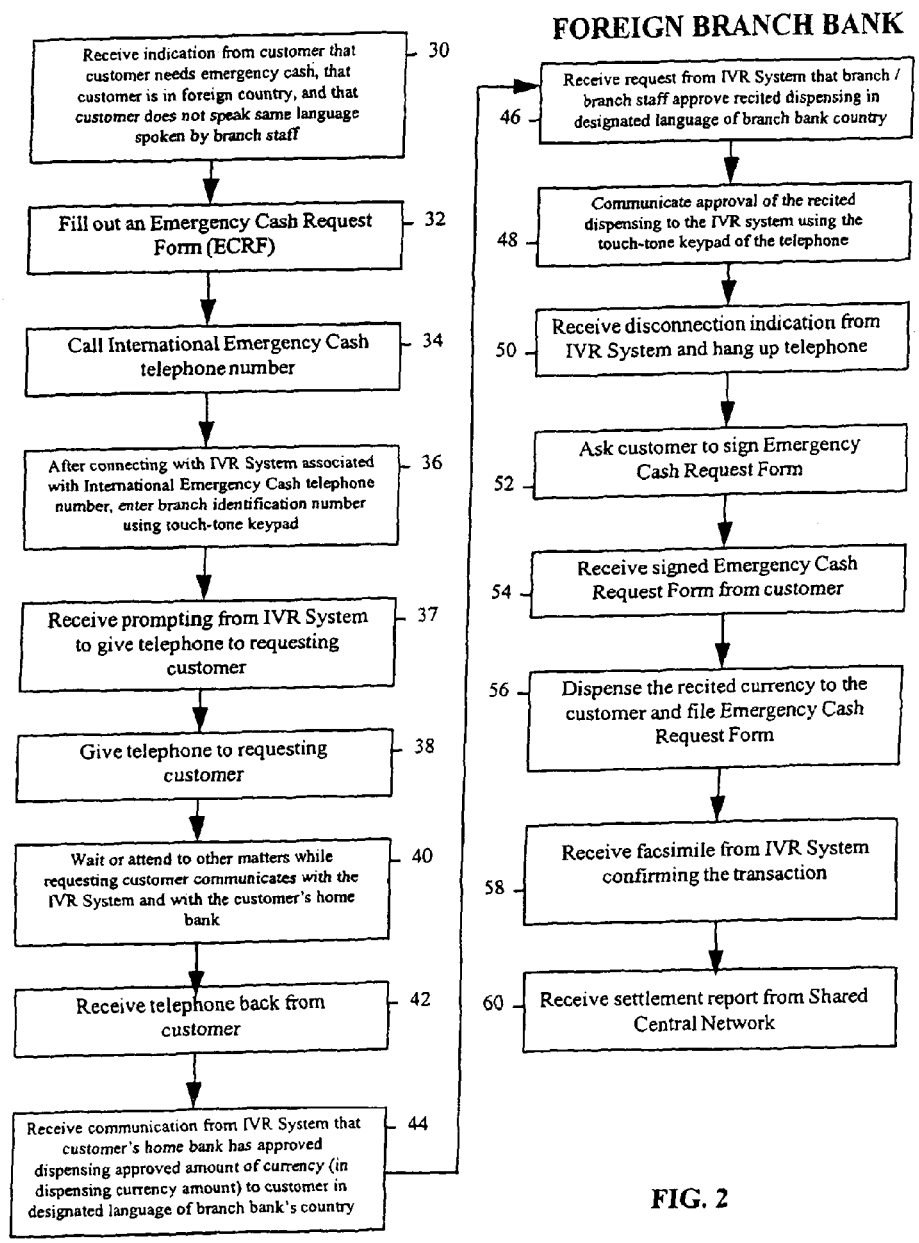

| Message Sets | Message Description | Does Central Network pass the Request message to the Front-ends. |
|---|---|---|
| 0800(810,820) | Network management request: Logon/Logoff/Encryption Key/Stay Alive | IVR System to Central Network only. |
| 0200 (210) | Financial transaction | IVR System to Central Network to Front-ends. |
| 0420 (430) | Acquire reversal advice | IVR System to Central Network to Front-ends. |
| 0620 (no response required) | Administrative advice | IVR System to Central Network only. |

FIG. 8

| Bit | ISO Field Name | Data Type | Type | Notes | Get Values From |
|---|---|---|---|---|---|
| | Message Type | N4 | M | | IVR System Moves "0200" into field |
| | Bit Map, primary | B64 | M | | Value will always be 'B23A640128A09042' since the system uses a dummy PIN "1234", and 'F23A640108A08042' if no PIN is required. |
| P-001 | Bit Map, extended (i.e., secondary) | B64 | C | | Same as above Value will always be '0000000001000000' |
| P-003 | Processing code | N6 | M | Please see App. B of Deluxe 8583. "01xx00" see Central Network's RC spec SCR-97048. | 200: IVR System Moves "01XX00" |
| P-004 | Amount, transaction | N12 | M | Transaction Amount in dispensed currency as defined in P-49 | 200: IVR System moves "01XX00" |
| P-007 | Transmission date & time | N10 | M | (mmddhrmnsc) | 200: IVR System converts System Time into GMT. Central Network overwrites this field and P-15 for all 200's. |
| P-011 | Systems trace audit number (P-37 is also a unique reference number. Central Network uses either P-11 & P-37 as unique identifier.) | N6 | M | Remains unchanged for *all* messages in one customer session. | IVR System supplies this. |
| P-012 | Time, local transaction (hrm nsc) | N6 | M | (hhmmss) | IVR System captures system time and a random number into a global variable at the start of the session and uses the same value for all messages in the entire session. |
| P-013 | Date, local transaction (mmdd) | N4 | M | Central Network, PEPs and IVR System are Year 2000 compliant (Y2K) | See P-012 |
| P-015 | Date, settlement (mmdd) | N4 | M | Central Network says system date is ok here. | 200: IVR System puts system date in GMT here. |
| P-018 | Merchant type - Required for Point-of-Sale terminals. | N4 | C | Constant value of "6011" | IVR System puts in "6011" per Central Network |
| P-019 | Acquiring institution country code | N3 | M | From ISO 3166 | IVR System provides this from a local database |
| P-022 | Point of service entry mode - | N3 | M | Constant value of "011" if no PIN is sent in the message. "012" when PIN is included. NOTE: The PIN included would be a "dummy" pin based on an algorithm. | |
| P-032 | Acquiring institution identification code | LLV N11 | M | FRDABA# of acquiring institution length may be either "10" or "11". Federal routing Destination American Banking Association Number. | IVR System gets from local table. |

FIG. 9A

| Bit | ISO Field Name | Data Type | Type | Notes | Get Values From |
|---|---|---|---|---|---|
| P-035 | Track 2 Data | LLV N37 (Business Specific) | C | This is a required field for IVR System.<br>Belgium:<br>It is constructed: 6 digit BIN + 8 digit CIN+ "000" + "=" (a 1 digit separator) + 4 digit future expiration year (system time in GMT + one year, this field is not checked by the Issuers)<br>Other Businesses:<br>It is constructed: PAN (entered by CSR. The first 6 digit of the PAN is the BIN)+ "000" + "=" (a 1 digit separator) + 4 digit future expiration year (system time in GMT + one year, this field is not checked by the Issuers) | Belgium:<br>The CSR enters the 8 digit CIN (aka, account number). IVR System will ensure the length entered is 8 digits. IVR System will prefix the BIN for Belgium which is retrieved from a local database table.<br><br>Other Businesses:<br>The CSR enters the entire PAN which is also known as CIN or Embossed Number). IVR System verifies the BIN portion of the PAN from a local table. IVR System also verifies the PAN is of the correct length. IVR System prompts the CSR for re-entry if either the BIN is incorrect or the PAN length is wrong. |
| P-037 | Retrieval reference number P-11 is also an unique identifier for the messages. | An12 | M | Julian Date YDDD (Y2K) + IVR System Sequence Number | IVR System provides this |
| P-041 | Card acceptor term identification | AN12 | M | Unique Identifier for Acquiring device | IVR System will put in IVR SYSTEM. |
| P-043 | Card acceptor name and location | ANS 8 | M | "EC:" prefixes other content<br>Address 1-23<br>City 24-36<br>State 37-48<br>Country 39-40 | IVR System gets REG E (name, address of acquiring branch) data from a table. IVR System moves the Acquirer Business Name, Branch ID and Address. IVR System also needs to prefix "EC" to stand for Emergency Cash as an indicator that is an emergency cash transaction for the hosts. |
| P-049 | Currency code, transaction | N3 | M | ISO Currency Code of Transaction amount (P-004) This is the dispensed amount | IVR System moves the Dispense Currency Code. ISO 4217 spec documents all the ISO codes. |
| P-052 | Pin data | B64 | M | 16 Hex characters | "1234" will be used. FEPs may or may not decrypt the PIN. FEP may or may not return PIN error if the error if the PIN is not "1234". |
| P-058 | National point of service condition code | LLLV N010 | M | | IVR System uses "0200100200" |
| P-063 | Central Network data (aka, Intercept data) | LLLV ANS 050 | M | Maximum length 008 Maximum length 050 Contains multiple, 8, subfields check Data Element details. | IVR System moves in pseudo terminal value identifying dispensing business. Central Network to provide this information. |

FIG. 9B

| Bit | ISO Field Name | Data Type | Type | Notes | Get Values From |
|---|---|---|---|---|---|
| S-104 | Transaction Description | LLLV ANS 100 | C | Contains Transaction identifier data for Central Network Daily ICC Activity Reports and standard warehouse file. | IVR System moves "CGEC" into this field from a global field for ALL IVR System ISO messages. |

FIG. 9C

| Bit | ISO Field Name | Data Type | Type | Notes | Expected Values From Central Network which IVR System uses in: log, report, fax, IVR flow |
|---|---|---|---|---|---|
| | Message type | N4 | M | Always "0210" | |
| | Bit map, primary | B64 | M | | |
| P-001 | Bit map, extended | B64 | M | | **see above |
| P-003 | Processing code | B64 | M | | "912000" per Central Network |
| P-004 | Amount, transaction | N12 | M | Copied from the 0X00 message | |
| P-005 | Amount, settlement | N12 | C | Copied from the 0X00 message | Returned by Central Network and logged by IVR System. |
| P-006 | Amount, cardholder billing | N12 | C | May be modified to reflect actual cardholder billing amount if account currency differs from what was supplied in the original 0X00. This field should be changed in conjunction with P-51. See Element details | Returned by Central Network and logged by IVR System. This is the exact amount to be taken from the customer's account |
| P-007 | Transmission date & time (mmddhrmnsc) | N10 | M | | Same as 200. |
| P-009 | Conversion rate, settlement | N8 | C | See Element details | Returned by Central Network and logged by IVR System. IVR System IVR flow will NOT recap for customer the equivalent amount in Cardholder currency. There is no chance to deny the transaction because the customer does not like the conversion rate. |
| P-010 | Conversion rate, cardholder billing | N8 | C | See Element details | Returned by Central Network and logged by IVR System. |
| P-011 | Systems trace audit number | N6 | M | Copied from the 0X00 message | |
| P-012 | Time, local transaction | N6 | M | Copied from the 0X00 message | |
| P-013 | Date, local transaction | N4 | M | Copied from the 0X00 message | |
| P-015 | Date, settlement (mmdd) | N4 | M | | IVR System merely logs this field. This field is used for reconciliation for reporting purposes by Central Network. Messages with the same settlement dates are grouped together. |
| P-018 | Merchant Type | N4 | C | Copied from the 0X00 message | |
| P-019 | Acquiring institution country code | N3 | M | Copied from the 0X00 message | IVR System uses this got this from IVR System local database when sending the 200. |
| P-022 | Point of service entry mode | N3 | M | Copied from 0X00 message | |

FIG. 10A

| Bit | ISO Field Name | Data Type | Type | Notes | Expected Values From Central Network which IVR System uses in: log, report, fax, IVR flow |
|---|---|---|---|---|---|
| P-032 | Acquiring institution identification code | LLV N11 | M | FRDABA # of the acquiring institution. Will be provided by Central Network. | Copied by Central Network from 200 & logged by IVR System. IVR System puts this on the fax and the reports. |
| P-035 | Track 2 Data | LLV N37 | C | Copied from the 0X00 | Copied from the OXOO |
| P-037 | Retrieval reference number | AN12 | M | Copied from the 0X00 message | IVR System uses this field for reversal messages. Needs to match the original 0200 msg. |
| P-039 | Response code | AN2 | M | | '00' is the only valid response, all other responses the transaction will be denied or redone. |
| P-041 | Card acceptor term identification | ANS8 | M | Copied from the 0X00 message | Not used by IVR System. |
| P-043 | Card acceptor name and location | ANS 40 | M | | IVR System puts this on faxes. |
| P-044 | Additional response data | LLV ANS 25 | C | If P-039 equal "30" then P-044 must be present. | |
| P-049 | Currency code, transaction | N3 | M | Copied from the 0X00 message | IVR System logs, puts on fax and reports. |
| P-050 | Currency code, settlement | N3 | C | MT: Primary fields: 4, 5, 6, 49, 50, 51 be included in the faxes. | Returned by Central Network, logged by IVR System. IVR System puts this on the fax and the reports |
| P-051 | Currency code, cardholder billing | N3 | C | | Returned by Central Network, logged by IVR System. IVR System puts this on the fax and the report in the case of 210? Fax is only generated for a successful 200/210 pair. |
| P-054 | Additional Amounts | LLLV An120 | O | | NA. Log if returned. |
| P-058 | National point of service condition code | LLLV N010 | M | Copied from the 0X00 message. IVR System gets these info for the 200 from the IVR System database proposed by MTI | RadioCiti logs and puts on fax/report |
| P-063 | Central Network data | LLLV ANS 050 | M | Copied from the 0X00 message. IVR System gets these info for the 200 from the IVR System database proposed by MTI | 210 NA Log if returned? |

FIG. 10B

| Bit | ISO Field Name | Data Type | Type | Notes | Expected Values From Central Network which IVR System uses in: log, report, fax, IVR flow |
|---|---|---|---|---|---|
| S-104 | Transaction Description | LLLV ANS 100 | C | Contains transaction identifier data. (see InterCiti Transfers) | Always put in "CGEC" for all messages by all originators such as IVR System, Central Network or front-ends. |
| S-113 | Authorizing agent identification code | LLLV AN011 | M | FRDABA # of the authorizing institution. Tells where to put on the settlement reporting. | IVR System only logs the field. IVR System does not put on fax/reports. Not in 200s. |
| S-114 | Authorizing agent country code | LLLV An003 | M M | IVR System gets these info for the 200 from the IVR System database. A regular 210 gets these from the Front-End. | IVR System only logs the field. IVR System does not put on fax/reports. Not in 200s. |
| S-126 | US Dollar Balances | LLLV ANS 100 | O | US Dollar balance equivalents to P-054 | Japan returns P-054 and this field. IVR System IGNORES them per Central Network. |

FIG. 10C

| BIT | ISO Field Name | Data Type | Type | Notes | IVR System gets Values From |
|---|---|---|---|---|---|
| | Message type | N4 | M | Advice uses 0420 | "0420" |
| | Bit map, primary | B64 | M | | ISO message vendor |
| P-001 | Bit map, extended | B64 | M | Required | ISO message vendor |
| P-003 | Processing code | N6 | M | Copied from 0X00, 0X20 | |
| P-004 | Amount, transaction | N12 | M | Copied from 0X00, 0X20 | |
| P-005 | Amount, settlement | | C | Copied from 0X00, 0X20 | |
| P-006 | Amount, cardholder billing | | C | Copied from 0X00, 0X20 | |
| P-007 | Transmission date & time (mmddhrmnsc) | N10 | M | | IVR System gets system time in the same manner as we did in 200 messages |
| P-009 | Conversion rate, settlement | N8 | M | Copied from 0X00, 0X20 | |
| P-010 | Conversion rate, cardholder billing | | | Copied from 0X00, 0X20 | |
| P-011 | System trace audit message | N6 | M | Copied from 0X00, 0X20 | |
| P-012 | Time, local transaction (hrmnsc) | N6 | M | Copied from 0X00, 0X20 | |
| P-013 | Date, local transaction (mmdd) | N4 | M | Copied from 0X00, 0X20 | |
| P-015 | Date, settlement (mmdd) | N4 | M | Copied from 0X00, 0X20 | Same as in 200 |
| P-018 | Merchant type | N4 | C | Copied from 0X00, 0X20 | |
| P-019 | Acquiring institution country code | N3 | | Copied from 0X00, 0X20 | |
| P-022 | Point of Service entry mode | N3 | M | Copied from 0X00, 0X20 | |
| P-032 | Acquiring institution country code | N3 | M | Copied from 0X00, 0X20 | |
| P-035 | Track 2 Data | LLV N37 | C | Please see field definition in the 200 message | Please see field definition in the 200 message. |
| P-037 | Retrieval reference number | AN12 | M | Copied from 0X00, 0X20 | |
| P-038 | Authorization Identification Response | AN6 | C | See note 2 | NA - will be used when IVR System is used for Bankcards in the future phrases. |
| P-039 | Response code | AN2 | M | Copied from 0X20 | |
| P-041 | Card acceptor term identification | ANS 8 | M | Copied from 0X00, 0X20, | |
| P-042 | Card Acceptor Identification Code | AN15 | C | For Bancard, which is not in phase-1, this is the auth. Ref. Number. | IVR System: if received in 210, echo in 420. |
| P-043 | Card acceptor name & Location | ANS 40 | M | Copied. | |
| P-048 | Merchant/Bank Name | LLLV ANS 025 | C | Copied. | |
| P-049 | Currency code, transaction | N3 | M | Copied from 0X00, 0X20 | |
| P-050 | Currency code, settlement | N3 | C | Copied from 0X00, 0X20 | |
| P-051 | Currency code, cardholder billing | N3 | M | Copied from 0X00, 0X20 | |
| P-058 | National point of service condition code | LLLV N010 | M | Copied | |

FIG. 11A

| BIT | ISO Field Name | Data Type | Type | Notes | IVR System gets Values From |
|---|---|---|---|---|---|
| P-060 | Reason code | LLLV ANS 006 | M | Contains multiple sub-fields check Data Element details. See Page 9-70 & App. A. of Central Network ISO Spec for codes. IVR System uses existing Reason Codes. | IVR System moves in the appropriate reason codes: IVR okays LBM to give cash based on 210 response. Line-down: code 63. Customer-decline: code 18. |
| P-063 | Central Network data | LLLV ANS 050 | M | Minimum length 008 Maximum length 050 Contains multiple sub-fields check Data Element details. See also Appendix C | |
| S-090 | Original data elements | N42 | M | Original message type required, remaining subfields should be zero filled | IVR System creates this. |
| S-104 | Transaction Description | LLLV ANS 100 | O | Contains Transaction identifier data. (see InterCiti Transfers) | "CGEC" |

FIG. 11B

| Bit | ISO Field Name | Data Type | Type | Notes | Expected Values from Central Network |
|---|---|---|---|---|---|
| | Message type | N4 | M | Always "0430" | |
| | Bit map, primary | B64 | M | | |
| P-001 | Bit map, extended | B64 | M | | |
| P-003 | Processing code | N6 | M | Copied from 0420 | |
| P-004 | Amount, transaction | N12 | M | Copied from 0420 | |
| P-005 | Amount, settlement | N12 | M | Copied from 0420 | |
| P-007 | Transmission date & time (mmddhrmnsc) | N10 | M | | |
| P-011 | Systems trace audit number | N6 | M | Copied from the 0420 | |
| P-012 | Time, local transaction (hrmnsc) | N6 | M | Copied from the 0420 | |
| P-013 | Date, local transaction (mmdd) | N4 | M | Copied from the 0420 | |
| P-035 | Track 2 data | LLV N37 | C | Please see field definition in the 200 message | Please see field definition in the 200 message. |
| P-037 | Retrieval reference number | AN12 | M | Copied from the 0420 | "00" means a reversal was performed. "30" will result in a manual reversal as is done for the CATs. |
| P-039 | Response code | AN2 | M | Will be either "00", ok, or "30", Format error | |
| P-044 | Additional response data | LLV AN25 | C | Present if P-039 = "30" | |
| P-049 | Currency code, transaction | N3 | M | Copied from the 0420 | |
| P-050 | Currency code, settlement | N3 | M | Copied from the 0420 | |
| P-090 | Original data elements | N42 | M | Copied from the 0420 | |

FIG. 12

| ISO8583 Element | Source System RC, ISO, Vendor, CS | Source Location | Template Citi-96 | Variable Length info | Hypothetical Msg Content from UK [Citi-96] |
|---|---|---|---|---|---|
| Msg Type | RC | RC-App Func | RC-M | n/a | 0200 |
| P-Map | ISO VENDOR | ISO VENDOR-Calculated | n/a | n/a | B23A64010BA18042 |
| P-001 S-Map | ISO VENDOR | ISO VENDOR-Calculated | RC-O | n/a | 000000000100000 |
| ~~P-002~~ | ~~RC~~ | ~~RC-Dbase-Func~~ | | ~~n/a~~ | ~~6722528021027431185~~ |
| P-003 | RC | RC-App Func | | n/a | 012000 |
| P-004 | RC | RC-Cust Entry | | n/a | 000000035000 |
| P-005 | RC | RC-Dbase Func | | n/a | n/a |
| P-006 | RC | RC-Dbase Func | | n/a | n/a |
| P-007 | ISO VENDOR /RC | ??-System Gen | | n/a | 1120120629 |
| P-009 | RC | RC-Dbase Func | | n/a | n/a |
| P-010 | RC | RC-Dbase Func | RC-O | n/a | n/a |
| P-011 | RC | RC-Generated | RC-M | n/a | 253952 |
| ISO8583 Element | Source System RC-ISO VENDOR -CS | Source Location | Template Citi-96 | Variable Length Info | Hypothetical Msg Content from UK [Citi-96] |
| P-012 | RC | System Gen | RC-M | n/a | 1206299 |
| P-013 | RC | RC-System Gen | RC-M | n/a | 1120 |
| P-015 | RC | RC-System Gen | RC-M | n/a | 1120 |
| P-018 | RC | RC Dbase Value | RC-M | n/a | 6011 |
| P-019 | RC | RC-Dbase Value | RC-M | n/a | 862 |
| P-022 | RC | RC-Dbase Func | RC-M | n/a | 012 |
| P-032 | RC | RC-Dbase Value | RC-M | 11 | 18402924210 |
| P-035 | RC | RCdb+CSR entry | RC-O | 37 | n/a |
| P-037 | RC | RC-System Gen | RC-M | n/a | 732310113626 |
| P-041 | RC | RC-Dbase Value | RC-M | n/a | 00001011 |
| P-043.1 | RC | RC-Dbase Value | RC-M | n/a | EC:Strand Strand 1 |
| P-043.2 | RC | RC-Dbase Value | RC-M | n/a | London |
| P-043.3 | RC | RC-Dbase Value | RC-M | n/a | GB |
| P-043.4 | RC | RC-Dbase Value | RC-M | n/a | GB |
| P-048 | RC | RC-Dbase Value | RC-M | n/a | Citibank UK |
| ISO8583 Element | Source System RC-ISO VENDOR -CS | Source Location | Template Citi-96 | Variable Length Info | Hypothetical Msg Content from UK [Citi-96] |
| P-049 | RC | RC-Dbase Value | RC-M | n/a | 826 |
| P-050 | RC | RC-Dbase Value | RC-O | n/a | n/a |
| P-051 | RC | RC-Dbase Value | RC-O | n/a | n/a |
| P-052* | RC | RC-System Value | RC-O | n/a | n/a |
| P-058 | RC | RC-Dbase Value | RC-M | n/a | 0000100200 |
| P-063.1 | RC | RC-Dbase Value | RC-M | 008/010 | AO |
| P-063.2 | RC | RC-Dbase Value | RC-M | n/a | IN7131 |
| P-063.3 | RC | RC-Dbase Value | RC-M | n/a | IGB |
| S-104 | RC | RC-Dbase Value | RC-M | 004 | CGEC |

FIG. 13

| RESPONSE CODE P-039 | RETURNED IN 0210 Msg. WHEN THESE CONDITIONS ARE ENCOUNTERED BY THE ISSUER | ACTION EXPECTED BY ACQUIRER | ACTION BY IVR SYSTEM |
|---|---|---|---|
| 00 | Authorization is approved | Dispense funds/execute requested transaction | Give Cash |
| 01 | The issuer wishes to contact the cardholder for some transaction or card usage related reason. | Decline the requested transaction. No funds dispensed. | Generic reject |
| 04 | Card has been flagged as stolen or the issue wishes to remove it from circulation for some reason. | Decline the requested transaction. No funds dispensed. | Generic reject if returned. Not expected. |
| 05 | Card is invalid for some reason determined by the issue. | Decline the requested transaction. No funds dispensed. | Generic reject. |
| 10 | Authorization requested is Approved, BUT for a Lesser amount than the amount requested. | Allow transaction (typically POS) to continue but only for the Lesser Amount. | Generic reject |
| 13 | Requested Rate or Currency Code is not available in the Central Network Rate Table. | Reject the transaction cycle process back to start. If Central Network can't calculate the settlement amount, it can't process the message, so after an unsuccessful 100, IVR System ends customer session. This is a serious database problem on IVR System or Central Network if it happens. | Generic reject. |
| 38 | PIN received with authorization request, upon decryption, did not match customers PIN on file. Counting this transaction the number of BAD PIN requests received with in the current reporting period exceeds the number allowed by the issuing institution. Increment BAD PIN counter. | Decline the requested transaction. Capture and Hold the card if possible. No funds dispensed. | Generic reject. This should never occur. |
| 39 | The card used is requesting access to a Credit Account or credit line and does not have a Credit Account linked. | Decline the requested transaction. No funds dispensed. | Generic reject. |
| 51 | Amount requested in the authorization request exceeds the amount available in the account selected. | Decline the requested transaction. Account type is determined by Processing/transaction code, DDA, SAV, Credit or other. No funds dispensed. | Ask customer for a lesser amount and retry. |
| 52 | The Card used does not have the necessary accounts related to it required to execute the requested transaction (The specific account is a function of the Processing/Transaction code in the original request.) | Decline the requested transaction. No funds dispensed. | Generic reject. |
| 53 | The card used is requesting access to a savings Account and does not have a savings Account linked. | Decline the requested transaction. No funds dispensed. | Generic reject. |
| 54 | Card used has expired, based upon the Track II data supplied in the transaction or upon information held in issuers data files. | Decline the requested transaction. No funds dispensed. | Generic reject. |
| 55 | PIN received with authorization request, upon decryption, did not match customers PIN on file. Increment BAD PIN counter. | Decline the requested transaction. No funds dispensed. | Generic reject. |
| 56 | Card used does not exists on the issuers data file. | Decline the requested transaction. No funds dispensed. | Ask CSR to reenter card number |
| 57 | Transaction requested is not permitted for this cardholder by issuer | Decline the requested transaction. No funds dispensed. | Generic reject. |

FIG. 14A

| RESPONSE CODE P-039 | RETURNED IN 0210 Msg. WHEN THESE CONDITIONS ARE ENCOUNTERED BY THE ISSUER | ACTION EXPECTED BY ACQUIRER | ACTION BY IVR SYSTEM |
|---|---|---|---|
| 61 | Transaction amount requested will bring cardholder over daily limit withdrawal limit. | Decline the requested transaction. No funds dispensed. | Generic Reject. (IVR System does not inform that amount requested will exceed daily limit. |
| 62 | Transaction requested is not authorized for this account (card) because of a local Issuer restriction. | Decline the requested transaction. No funds dispensed. | Generic reject. |
| 65 | Transaction requested will bring cardholder over daily withdrawal frequency limit. | Decline the requested transaction. No funds dispensed. | Generic reject. |
| 75 | PIN received with authorization request, upon decryption, did not match customers PIN on file. Counting this transaction the number of BAD PIN requests received with in the current reporting period exceeds the number allowed by the issuing institution. Increment BAD PIN counter. | Decline the requested transaction. No funds dispensed. Return card see code "38" also. | Generic reject. (Should never occur because IVR System uses a Dummy PIN) |
| 88 | Transaction received as Sale Completion refers to an pre-authorization. | Decline the requested POS transaction, NOTE: This code should only be returned if the pre-authorization has expired and the account now has insufficient funds to cover the transaction | Generic reject. |
| 93 | Requested transaction cannot be completed by the issuer as it would entail a violation of local law. | Decline the requested transaction. No funds dispensed | Generic reject. |
| 94 | Issuer system could not find the requested target account linked to the cardholders card. | Decline the requested transaction. No funds dispensed | Generic reject. |
| 95 | Issuer system could not find the requested target account linked to the cardholders card. | Decline the requested transaction. No funds dispensed | Generic reject. |
| ??? | Calculated Transfer Rate differs from rate presented Indicates change in Rates from Get Exchange rate step. | Decline the requested transaction. No funds moved/Transferred | Generic reject. |
| ??? | Calculated Transfer Rate differs from rate presented. Indicates change in Rates from Get Exchange rate step. | Decline the transaction. No funds moved/Transferred. | Generic reject. |
| 12 | Card used is invalid for the requested transaction, was not routed to the issue for authorization. | Decline the requested transaction. No funds dispensed. | Ask CSR to reenter to the card number |
| 30 | Transaction was received with a format error. Transaction was not forwarded to issuer for action. | Decline requested transaction. No funds dispensed. | Generic reject |
| 76 | Encryption Keys exchanged between the Central Network system and the Issuer system are out of synchronization. Key changes requests failed or was not responded to. | Decline requested transaction. No funds dispensed. | Generic reject |
| 79 | Issuer authorization system is not available to act upon the requested transaction. Transaction was not forwarded to issuer for action. | Decline requested transaction. No funds dispensed. | Tell customer issuer is not available |

FIG. 14B

| RESPONSE CODE P-039 | RETURNED IN 0210 Msg. WHEN THESE CONDITIONS ARE ENCOUNTERED BY THE ISSUER | ACTION EXPECTED BY ACQUIRER | ACTION BY IVR SYSTEM |
|---|---|---|---|
| 91 | Issuer system is not currently signed on to the Central Network system. Transaction was not forwarded to issuer for action. | Decline requested transaction. No funds dispensed. | Tell customer the issuer is not available |
| 92 | Financial institution can not be found for routing. | Decline requested transaction. No funds dispensed. | Generic reject |

| RESPONSE CODE P-039 P-060 | REVERSAL REASON CODES FOR 0420 REVERSAL MSG. WHEN THESE CONDITIONS ARE ENCOUNTERED BY THE ACQUIRER | ACTION EXPECTED BY ACQUIRER | ACTION EXPECTED BY THE ISSUER | THE REVERSAL REASON CODE APPLIES TO IVR System |
|---|---|---|---|---|
| 00 C0 23 00 (0420 Msg) | Authorization response not received from Central Network in allowed time period. (Reversal sent at time-out) | Decline the requested transaction. No funds dispensed. | Decline the requested transaction. No funds dispensed. | Yes |
| 00 C0 27 00 (0420 Msg) | Authorization response received from Central Network after reversal received for time-out. (Reversal sent for late authorization) | Reverse the transaction back to Central Network. No funds dispensed. | Accept "Reversal" message from Central Network. Credit the cardholder account for original authorized amount. | Yes |
| 00 C0 33 00 or C0 24 00 (0420 Msg.) | Acquiring machine failed to dispense funds authorized. | Reverse the requested transaction back to Central Network. | Accept "Reversal" message from Central Network. Credit the cardholder account for original authorized amount. | Yes Phone line drops before IVR System receives positive confirmation of funds dispensed? |
| 00 C0 ?? ?? (0420 Msg.) | Acquiring machine failed to dispense exact amount of funds authorized (partial or over dispense). | Send a "Reversal" message to Central Network identifying the actual amount dispensed. This may be a "full" reversal for the amount authorized followed by a "Force post" for the amount actually dispensed. | Accept "Reversal" message from Central Network identifying actual amount dispensed. Debit/Credit cardholder account accordingly. | No? |
| 00 C0 18 00 (0420 Msg) | ICC only - Customer declined the transaction after authorization received. | Decline the requested transaction. Reverse the full amount of the authorization back to Central Network. | Decline the requested transaction. Reverse the authorization, credit, cardholder account. | Yes The home bank or the branch or the customer could have declined the authorized transaction) |
| 00 C0 25 00 (0420 Msg) | Acquiring originated Reversal due to a communications error. | Send a "Reversal" message to Central Network identifying the actual amount dispensed. This may be a "full" reversal for the amount authorized followed by a "Force post" for the amount actually dispensed. | Accept "Reversal" message from Central Network identifying actual amount dispensed. Debit/Credit cardholder account accordingly. *RC: If phone line dies then use "25 as Response Code.* | Yes |

FIG. 14C

| RESPONSE CODE P-039 P-060 | REVERSAL REASON CODES FOR 0420 REVERSAL MSG. WHEN THESE CONDITIONS ARE ENCOUNTERED BY THE ACQUIRER | ACTION EXPECTED BY ACQUIRER | ACTION EXPECTED BY THE ISSUER | THE REVERSAL REASON CODE APPLIES TO IVR System |
|---|---|---|---|---|
| 00 C0 ?? ?? (0220 Msg) | Acquiring machine failed to dispense exact amount of funds authorized (partial or over dispense). | Send a "Reversal" message to Central Network identifying the actual amount dispensed. This may be a "full" reversal for the amount actually dispensed. | Accept "FORCE POST" message from Central Network identifying actual amount dispensed. Debit/Credit cardholder account accordingly. | No? |

FIG. 14D

SYSTEM AND METHOD FOR AUTOMATED DEBITING AND SETTLING OF FINANCIAL TRANSACTIONS

CROSS REFERENCE TO RELATED APPLICATIONS

This application is a continuation of pending U.S. patent application Ser. No. 12/081,493, filed Apr. 16, 2008, which is a continuation of U.S. patent application Ser. No. 09/387,381, filed Sep. 2, 1999, which claims the benefit of U.S. Provisional Application No. 60/098,995 filed Sep. 2, 1998, each of which is incorporated herein by this reference.

FIELD OF THE INVENTION

This invention relates to automated financial transactions using an interactive voice response (IVR) system. More particularly, the present invention relates to an automated system for debiting and settling emergency cash transactions.

BACKGROUND

Assistance in language translation is required when a traveling bank customer who lost or misplaced the customer's debit card is unable to communicate with the staff of a branch bank in a foreign country. Manual emergency-cash procedures, for example the maintenance of a list of bank personnel with foreign-language skills, have several complications. Some of these complications are described in U.S. Pat. No. 5,794,218 to Jennings et al ("the '218 patent"), which is incorporated by reference herein. Accordingly, it is advantageous to employ an automated multilingual interactive system and method to perform financial transactions, such as the system and method disclosed in the '218 patent. The '218 patent discloses a system and method for allowing telephone-based interactive performance of financial transaction in multiple languages.

One complication in performing a financial transaction with an automated, multilingual interactive-system is the handling of the debit and the settlement associated with the transaction. Once the transaction is authorized and the customer receives the requested currency, the debit must be forwarded to the appropriate business, or issuer, and logged. Moreover, the transaction must be settled by, for example, transferring funds to complete the transaction from the issuer to the local acquirer. Manual forwarding, logging, and settling can give rise to several complications. For example, manual forwarding, logging, and settling can give rise to delay. As the foreign-exchange rate sometimes fluctuates a great deal, delay can impact the transaction. As another example, manual forwarding, logging, and settling can give rise to administrative errors, such as data-entry errors. As another example, manual forwarding, logging, and settling is costly, in that it requires the use of trained employees, sometimes including employees with foreign-language skills, to administrate the process.

SUMMARY OF THE INVENTION

It is a feature and advantage of the present invention to provide a method and system for automated settlement including interactive voice response (IVR).

It is an additional feature and advantage of the present invention to provide a method and system for automated settlement and on-line debit with interactive voice response useful, for example, in an emergency-cash situation.

It is also a feature and advantage of the present invention to provide a method and system for reducing the delay associated with manual forwarding, logging, debiting, and settling.

It is a further feature and advantage of the present invention to provide a method and system for otherwise reducing the amount of time required to complete a transaction such as an emergency-cash transaction by using automatic procedures and automatic communication.

It is a further feature and advantage of the present invention to provide a method and system that lessens the impact that fluctuations in the foreign-exchange rate might have on the cost of transactions such as an emergency-cash transaction.

It is a further feature and advantage of the present invention to provide a method and system for reducing administrative errors, such as data-entry errors, occurring in transactions such as emergency-cash transactions.

It is still a further feature and advantage of the present invention to reduce the labor cost associated with transactions such as emergency-cash by reducing the number of trained employees, including employees with foreign-language skills, to administrate the transaction.

It is a further feature and advantage of the present invention to provide an automated emergency-cash (EC) system and method.

It is a still further feature and advantage of the present invention to provide a method and system for automating the emergency-cash procedures in order to reduce session time and increase customer satisfaction.

It is a further feature and advantage of the present invention to provide a system and method for automating processes such as customer-account debits and settlement of funds between acquiring and issuing businesses (e.g., the business issuing the debit card of the customer) in emergency cash transactions, which enhances the customer experience and contributes to the reduction of staff time servicing emergency cash transactions.

It is also a feature and advantage of the present invention to provide a system and method that uses existing communication interface standards to carry out transactions and communication.

It is a further feature and advantage of the present invention to provide a system and method that can employ conventional routing mechanisms for authorization, conventional settlement and funds movement mechanisms, and conventional reporting mechanisms for reconciliation in order to facilitate use of embodiments of the present invention.

To achieve the stated and other features, advantages, and objects, an embodiment of the present invention provides numerous benefits to bank customers, such as help with emergency cash in a familiar language while traveling, easy-to-use interface, faster service than manual procedures, automated and full information disclosure (such as amount in local and home currency, and applicable foreign exchange rate), greater comfort and feeling of transaction control by using home language, and global availability. An embodiment of the present invention also has many features, advantages, and objects that benefit the home bank, such as customer loyalty as a result of providing helpful and efficient emergency-cash procedures, time savings over manual procedures (up to 50-70% per transaction), reduced telephone-number requirements, automated audit trail, no or little additional equipment needed at foreign branch or home bank compared with conventional systems, automated foreign exchange rate inquiries and application, on-line debit and settlement (within 24 hours), and minimal staff training necessary to use.

An embodiment of the present invention provides a telephone-based interactive voice response (IVR) system designed to assist the traveling customers and home bank staff in the entire emergency cash (EC) process. It provides automation of the customer account debit, foreign exchange rates, and settlement between businesses. It also provides choice of languages to remove potential communication barrier between the customer and branch staff, between foreign branch staff and customer's home bank, and between customer and the home bank. The invention further provides scripted menus which guide the customer and staff through the EC process thereby saving time and providing an audit trail of the transaction.

An embodiment of the present invention provides a method and system whereby the system can solicit commands and interact with the foreign branch staff, the customer, and the home bank in the language of choice for the customer and for the foreign branch staff. It acts as an intermediary which can converse and assist in the language of each party involved, and provides a telephonic bridge between the customer and staff at a branch and the home bank. Once a customer is identified, the home bank can authorize the dispensing of emergency cash to the customer at a foreign branch bank. The system records the transaction and communicates authorization to the foreign branch bank to dispense the emergency cash. Moreover, the present invention provides a method and system whereby once a transaction is authorized, the system will perform an on-line transaction which will debit the customer's account, and electronically move the money from the issuing business to the acquiring business.

A method for automated settlement of a financial transaction according to an embodiment of the present invention includes receiving identification of a currency-dispensing entity, receiving identification of a caller language, receiving identification of a caller, bridging said caller to a home bank, receiving a request for a financial transaction, said transaction comprising the dispensing of currency by said currency-dispensing entity to said caller, communicating with said caller in the caller's language, calculating an amount of currency approved for dispensing to said caller, communicating to a currency-dispensing entity the amount of currency approved for dispensing to said caller in the language associated with the currency-dispensing entity, and automatically initiating a settlement of said transaction. A method for automated settlement of a financial transaction according to the present invention may also include other steps, including automatically initiating on-line debit of said caller's account and automatically accessing foreign-exchange rates.

A method according to an embodiment of the present invention may be an emergency-cash transaction, and the identification of a caller's language may be received telephonically and comprise a DTMF signal. Communicating with the caller or with the currency-dispensing entity may be done with an automatic voice. Automatically initiating a settlement of the transaction includes, for example, communicating with the currency-dispensing entity and with an issuer. Also, automatically initiating on-line debit of the caller's account includes, for example, forwarding a debit message to an issuer, and automatically initiating a settlement of the transaction includes, for example, communicating with an account, such as a settlement account or international settlement account. The Shared Central Network may both initiate and carry out settlement of the transaction(s) by using, for example, settlement accounts associated with the issuer and acquirer.

In an embodiment of the present invention, the Shared Central Network includes, for example, an international account network or an automated clearinghouse network or automated clearinghouse function. In an embodiment of the present invention, the issuer includes, for example, a business unit of the home bank, and the debit message is, for example, a cash withdrawal message.

In a method according to an embodiment of the present invention, additional aspects include, for example, communicating the availability of the issuer and logging the transaction, such as logging the identification of the issuer and the identification of the currency-dispensing entity in a database.

In an embodiment of the present invention, automatically initiating a settlement of the transaction includes, for example, automatically initiating movement of funds between the issuer and the currency-dispensing entity, such as an acquirer.

In an embodiment of the present invention, systems for automated settlement of a financial transaction include, for example, the means for carrying out the above-mentioned method and others. Moreover, systems according to an embodiment of the present invention include, for example, an IVR system comprising scripts in at least two languages, a central network in communication with the IVR system, an issuer in communication with the central network, a foreign acquirer in communication with the IVR system, a home bank in communication with the IVR system, an account, such as a settlement account, in communication with the central network, and a database that is in communication with the central network and has data related to financial transactions occurring over a pre-defined time period. The central network automatically initiates settlement of at least one emergency cash transaction. The system usually includes at least two settlement accounts, one for the acquirer (or currency-dispensing entity) and one for the issuer.

Systems according to an embodiment of the present inventions, for example, a database in which issuer data and acquirer data for at least one emergency cash transaction is stored. Moreover, the Shared Central Network includes, or is in communication with, at least one international settlement account, e.g., a STAAR Account, and the Central Network can include an automated clearinghouse network or feature.

A system for automated settlement of a financial transaction according to an embodiment of the present invention includes, for example, a currency-dispensing entity identifier in communication with a currency-dispensing entity, a caller language identifier in communication with a caller, a caller identifier, a call bridge processor, including a telephonic bridge for currency-dispensing entity and a home bank, a financial transaction request receiver, which transaction comprises the dispensing of currency by the currency-dispensing entity to the caller, a caller communicator having caller-language communicator, an approved-currency calculator comprising data reflecting the amount of currency approved for dispensing to the caller, an approved-currency communicator comprising automatic voice data in the language associated with the currency-dispensing entity reflecting the amount of currency approved for dispensing to the caller, and an automatic transaction settlement initiator.

BRIEF DESCRIPTION OF THE DRAWINGS

FIG. 2 is a sample processing flow diagram for a foreign branch bank and its staff for an embodiment of the present invention.

FIG. 8 is a table showing information about sample messages generated by the IVR System for an embodiment of the present invention.

FIG. 9A is a table of sample information related to an 0200 Financial Transaction Request message for an embodiment of the present invention.

FIG. 9B is a continuation of the table shown in FIG. 9A.

FIG. 9C is a continuation of the table shown in FIGS. 9A and 9B.

FIG. 10A is a table of sample information related to an 0210 Financial Transaction Response message for an embodiment of the present invention.

FIG. 10B is a continuation of the table shown in FIG. 10A.

FIG. 10C is a continuation of the table shown in FIGS. 10A and 10B.

FIG. 11A is a table of sample information related to an 0420 Acquirer Reversal Advice message for an embodiment of the present invention.

FIG. 11B is a continuation of the table shown in FIG. 11A.

FIG. 12 is a table of sample information related to an 0430 Acquirer Reversal Response message for an embodiment of the present invention, generated in response to an 0420 message.

FIG. 13 is a table of sample information showing sample content of an ISO 0200 message for an embodiment of the present invention.

FIG. 14A is a table of sample response code definitions comprising expected response codes for particular messages for an embodiment of the present invention.

FIG. 14B is a continuation of the table shown in FIG. 14A.

FIG. 14C is a continuation of the table shown in FIGS. 14A and 14B.

FIG. 14D is a continuation of the table shown in FIGS. 14A, 14B, and 14C.

DETAILED DESCRIPTION

Figure 1:
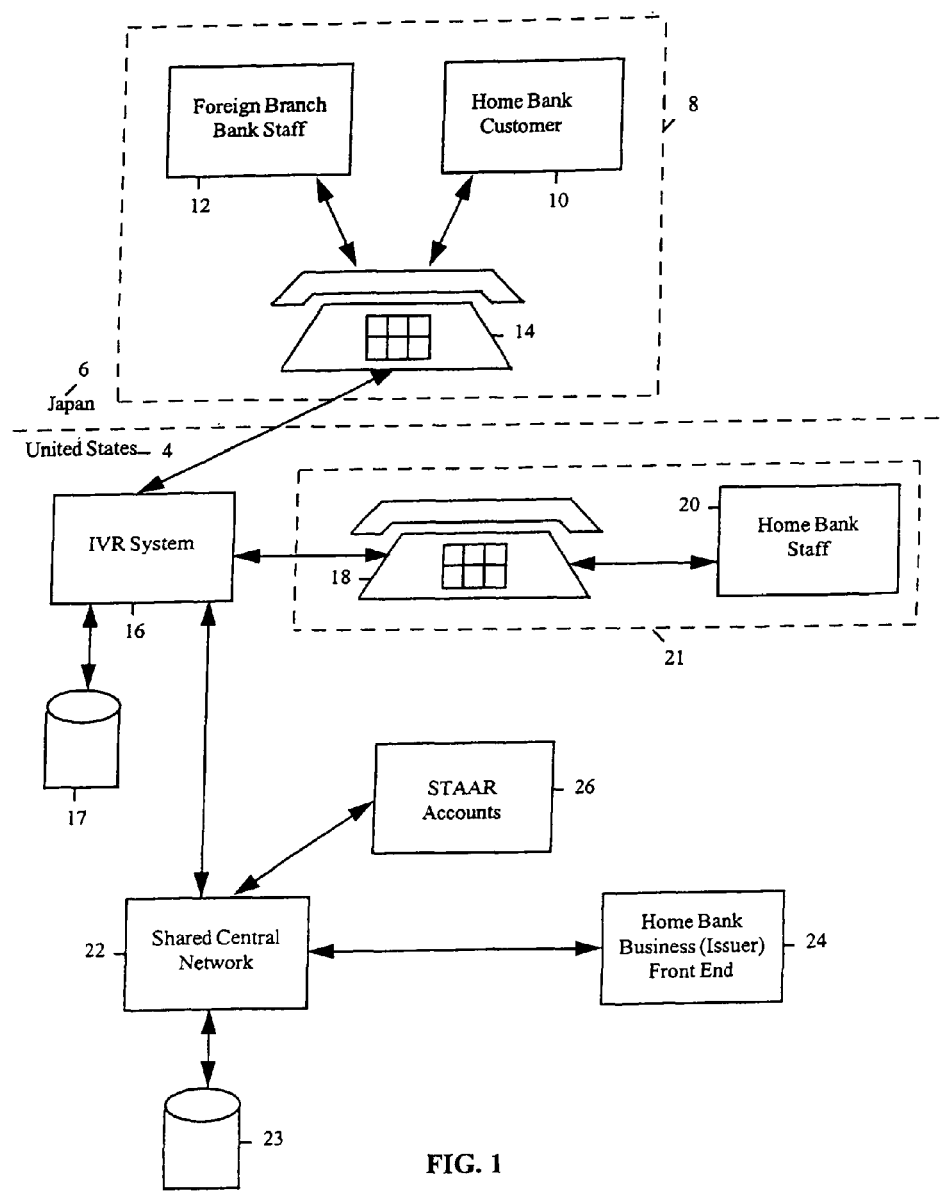
FIG. 1 is an overview block diagram of an example of the integrated components and communication links of a financial transaction processing system for an embodiment of the present invention.

The system depicted in FIG. 1 shows an embodiment of the present invention. With reference to FIG. 1 and FIGS. 2-6, which show sample process steps comprising an embodiment of the present invention, a detailed description of the preferred embodiment of the invention is described herein.

FIG. 1 shows a telephone 14 accessible to at least one staff member 12 of a foreign branch bank 8 and to a home bank customer 10 present in the branch bank 8, an IVR (Interactive Voice Response) System 16, a database 17 associated with the IVR System 16, a telephone 18 accessible to a staff member 20 of a home bank 21, a Shared Central Network 22 and associated database 23, and at least one home-bank business 24, which includes a front-end system. In the embodiment shown, the home-bank business is the issuer of the debit card of the customer, and is the entity with which the customer maintains at least one customer account. FIG. 1 also shows accounts 26. The accounts 26 shown comprise settlement accounts, or international settlement accounts, here called STAAR accounts. The accounts 26 shown include a settlement account for the foreign branch bank 8 (acquirer) and a settlement account for the home bank business (or issuer) 24. The accounts 26 may include accounts of other participating business entities and institutions.

The shown home bank 21, IVR System 16, Shared Central Network 22, settlement accounts 26, and associated hardware, software, and personnel are present in the United States 4. The foreign branch bank 8 and associated hardware and personnel, in addition to the home bank customer 10, are present in Japan 6. At least one fax machine (not shown) is present at the foreign branch bank 8 and at least one at the home bank 21, and the IVR System 16 is capable of sending facsimiles to those fax machines. In other embodiments, the Shared Central Network 22 may have the capability of sending facsimiles to those fax machines.

The IVR System 16 is an interactive-voice response system. Such systems include automatic voice response units, voice response units, automatic response units, and network interactive voice response systems can also be used. The IVR System 16 preferably prompts and communicates using a recorded voice. Other embodiments may include synthesized voice. The prompts and other communications result from pre-programmed scripts. The IVR System 16 receives communication in the form of DTMF (dual tone multi-frequency) or touch-tone. The IVR System may also receive communication in the form of spoken word if equipped with voice-recognition means. Those of ordinary skill in the art are familiar with such systems.

A customer 10 of a United States-based bank 21 (herein called the "home bank") visiting a foreign country sometimes has a need for emergency cash in the currency of the foreign country. For example, the home bank customer's currency may have been stolen, or lost, and the customer needs currency to purchase transportation back to the United States, to purchase food and accommodations, and to purchase other goods and services.

Figure 4:
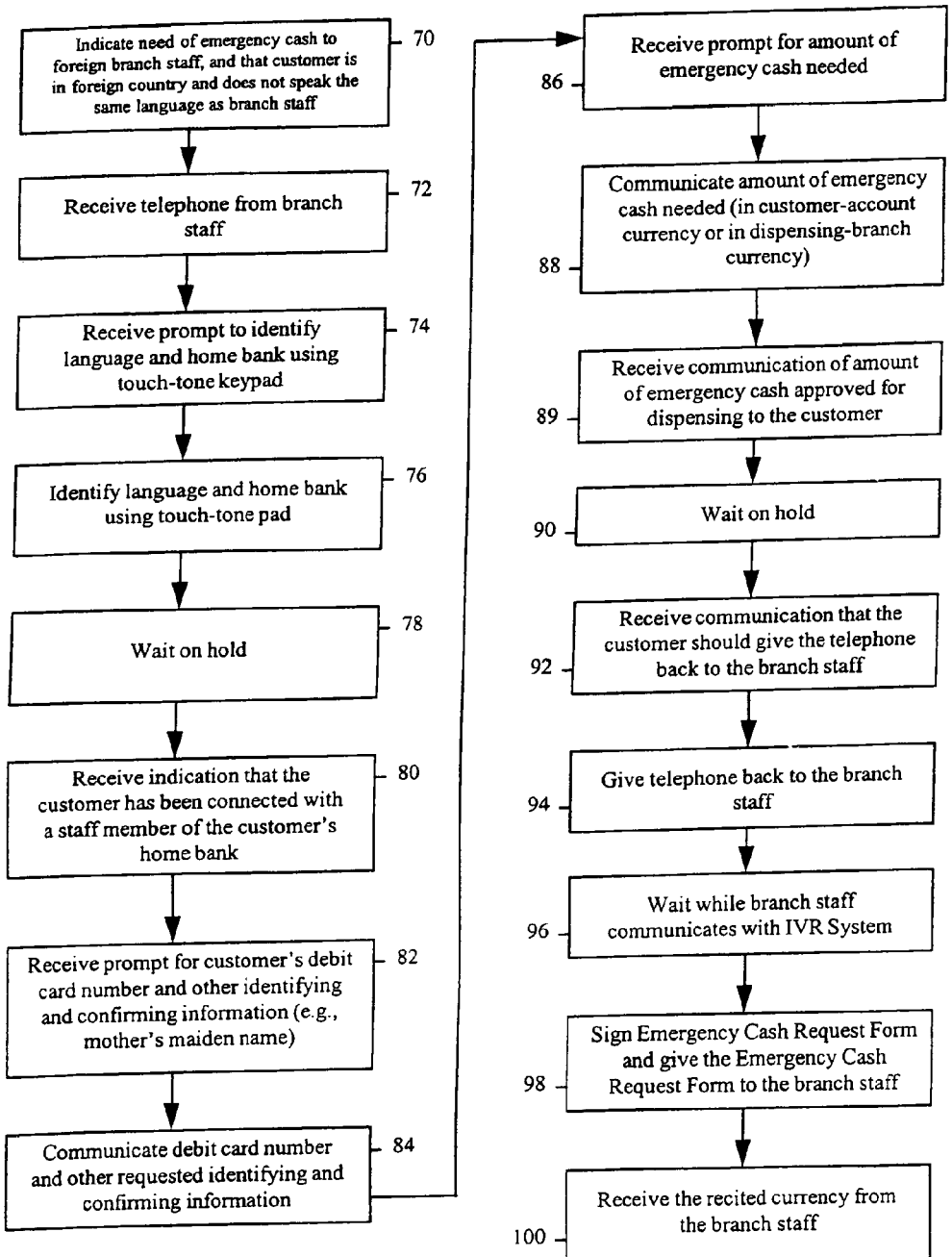
FIG. 4 is a sample processing flow diagram for a home-bank customer in a foreign country using an embodiment of the present invention.

With reference to FIG. 1, FIG. 2, and FIG. 4, the home bank customer 10 enters a branch bank 8 in the foreign country 6 (for example, Japan). The customer 10 indicates 70 a need for emergency cash to foreign branch staff 12, and indicates that the customer 10 is in a foreign country and does not speak the same language as the branch staff 12. For example, the customer 10 may speak enough Japanese to indicate to the foreign branch staff that the customer 10 lost the customer's currency and is seeking assistance. In the embodiment shown, the currency-dispensing entity 8 is a foreign branch bank of the home bank 21, but embodiments of the present invention include foreign branch banks which are branches of banks other than the home bank, as well as other currency-dispensing entities institutions or entities.

Once the branch staff 12 receives and understands 30 an indication from the customer 10 that the customer 10 needs emergency cash, that the customer 10 is in a foreign country, and that the customer 10 does not speak the same language spoken by the branch staff 12, the branch staff 12 fills out an Emergency Cash Request Form (ECRF) 32. Subsequently, a branch staff member 12 calls an international emergency cash telephone number 34. The telephone number is associated with an IVR System 16 and an International Emergency Cash incoming telephone line associated with the IVR System 16 in the customer's home bank country, the United States 4.

Figure 3A:
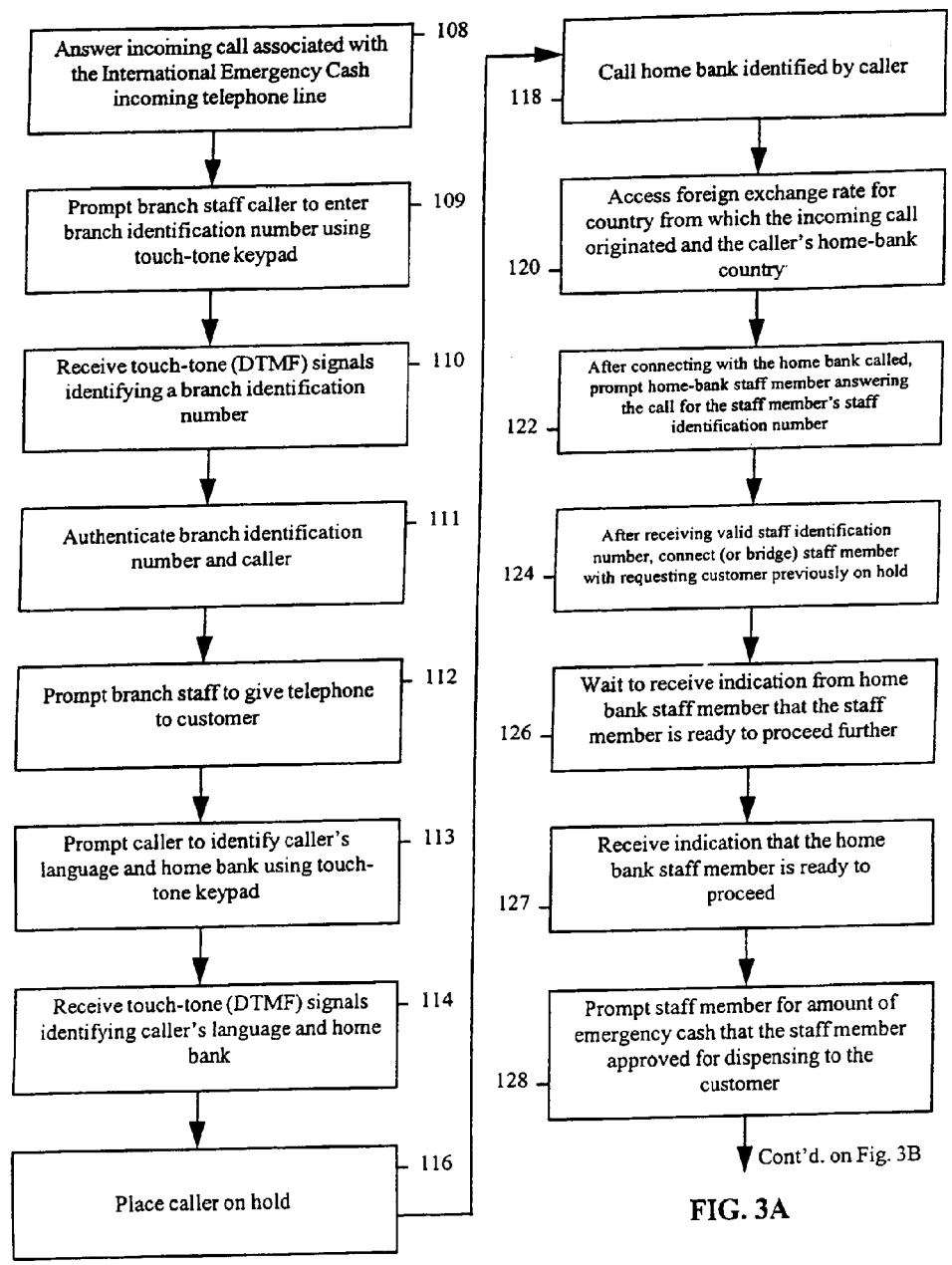
FIG. 3A is a sample processing flow diagram for an IVR System for an embodiment of the present invention.
Figure 3B:
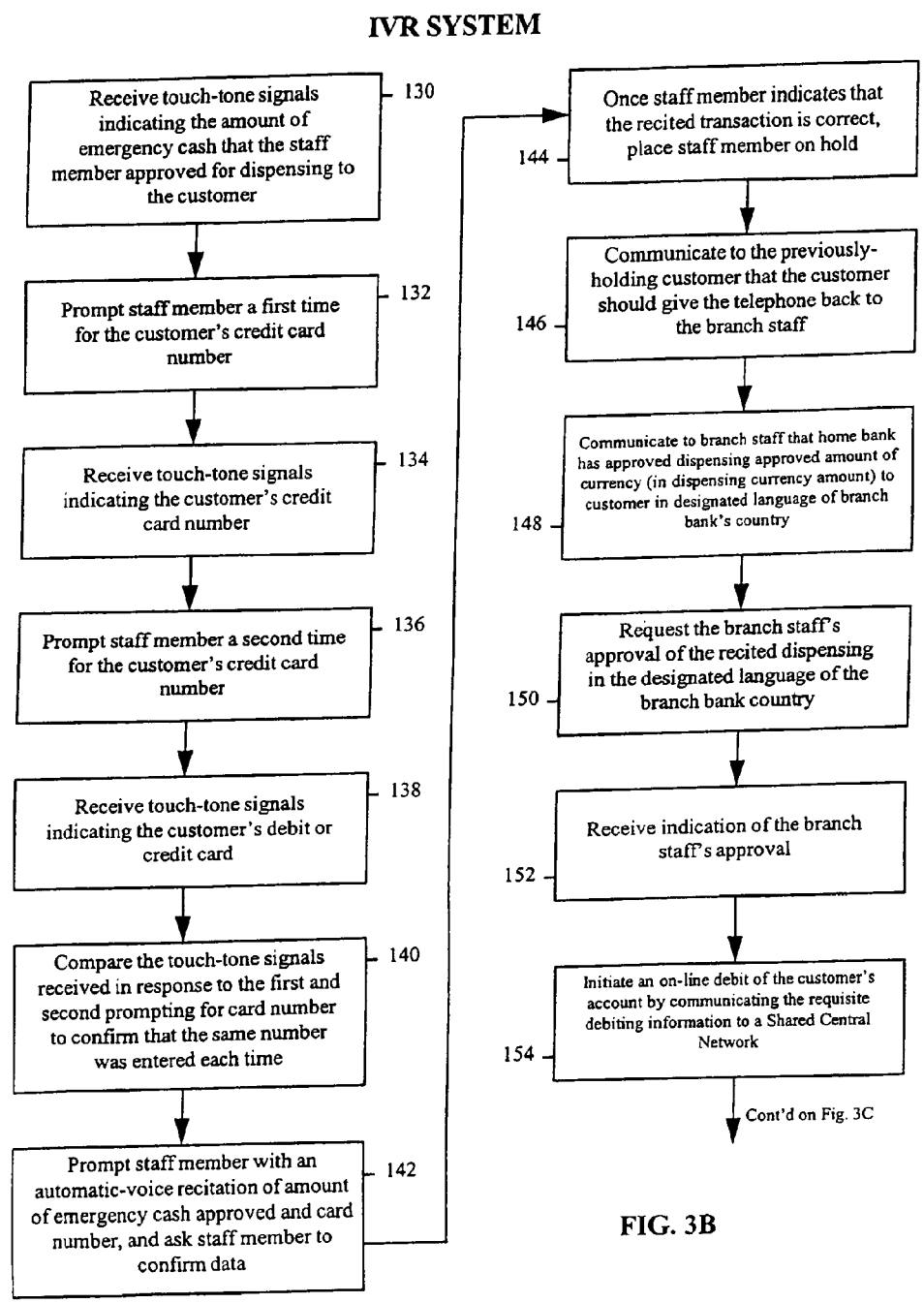
FIG. 3B is a continuation of the sample processing flow diagram in FIG. 3A.
Figure 3C:
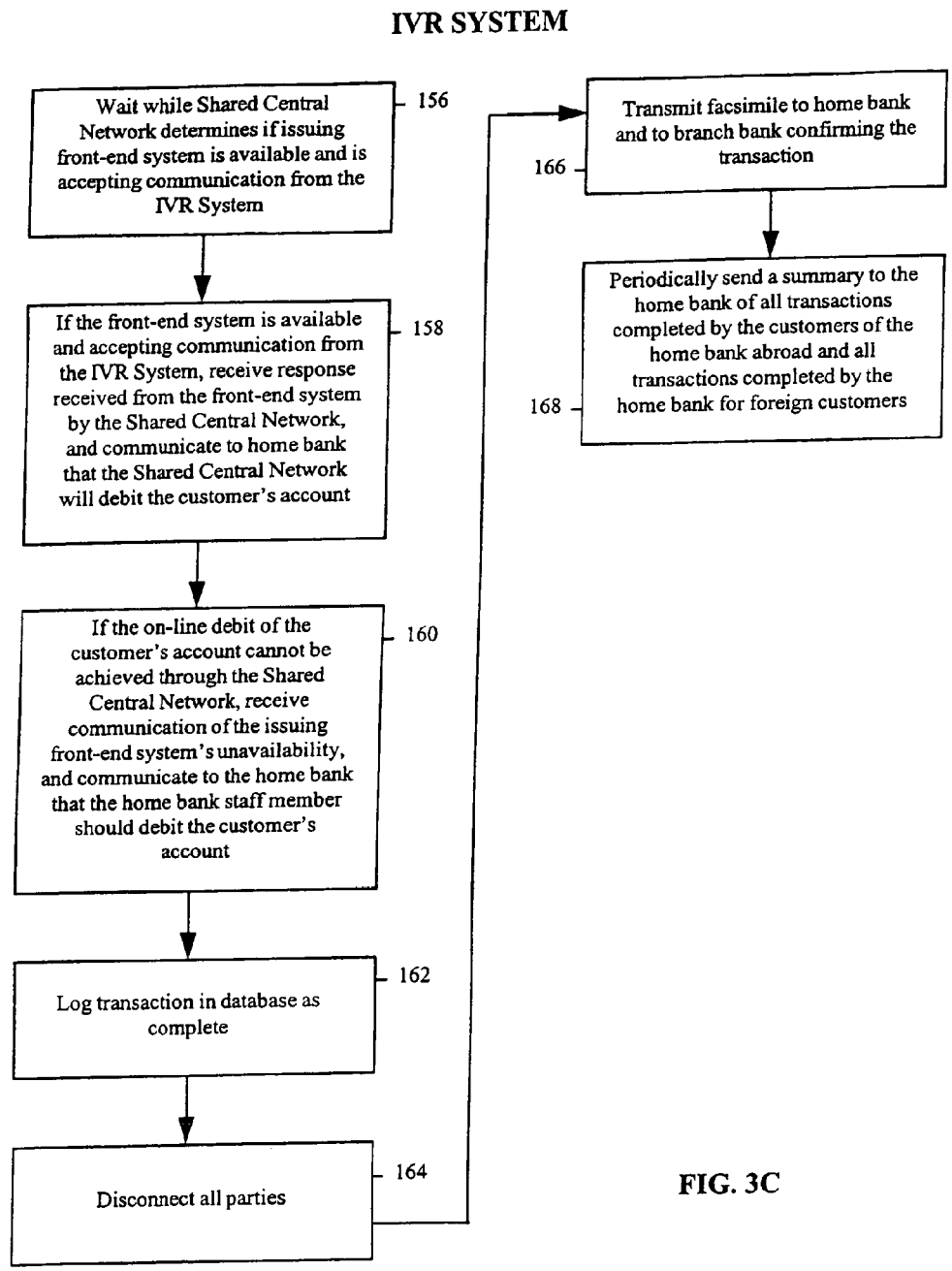
FIG. 3C is a continuation of the sample processing flow diagram in FIG. 3A and FIG. 3B.

Referring to FIGS. 3A, 3B, and 3C, the IVR System 16 answers the incoming call 108 and prompts the branch staff caller to enter a branch identification number using touch-tone keypad 109. The IVR System 16 will provide a pre-defined amount of time for the branch staff caller to respond, or to request additional time to respond, before timing out and disconnecting. Time-outs are provided at all points in communicating with the IVR System 16, and, in the interest of clarity, time-outs will not be mentioned herein at each point. The branch staff 110 caller enters the branch identification number using a touch-tone keypad 36. The IVR system 116 receives the touch-tone (DTMF) signals provided by the branch staff 110, and authenticates the branch identification number 111. Authentication may be accomplished by requesting a password or other code from the caller 111, and comparing the identification number and password entered with the expected data stored in a database 17. The database 17 associated with the IVR System 16 includes business contact names, telephone numbers, facsimile numbers, identification numbers, and passwords of participating issuers, foreign branch banks, and other information that will facilitate communication and operation of the system.

The emergency cash system preferably includes a global process to update, add, and delete the information kept in the database 17 on branch and home bank telephone numbers, staff identification numbers, and related information. This process can either be manual, automatic, or both. Manual database update is made by an authorized operator at the request of a business. The database 17 may automatically receive its data from other databases that maintain such information for a home bank, for example, and automatically integrate that data. Using a bank-wide single source will help to ensure the integrity of the data. Automatic update is not a requirement, but is a preferred method of updating.

Once authentication 111 is completed, the IVR System 16 prompts the branch staff caller to give the telephone to the customer 10 in need of emergency cash 112. The staff member gives the telephone to the requesting customer 38, and waits or attends to other matters while the requesting customer communicates with the IVR system and with the customer's home bank 40.

The home bank customer 10 receives the telephone from the branch staff 72. The IVR System 16 prompts the customer to identify the customer's language and home bank using the touch-tone keypad 113. For example, the IVR System 16 will prompt the caller with a script reciting various languages, and reciting the keypad number the caller should press if a particular language is the caller's language. The prompting will take place in various languages. The IVR System 16 is programmed to support multiple languages to facilitate interface with foreign branch staff, the customer, and the home bank staff. The IVR System 16 supports at least ten languages. The IVR System 16 offers at least two modes of selection: selection immediately after a voice prompt or a direct-selection at any time. Such modes allow the user to skip the menu of choices when the language code is known. Other embodiments may offer voice-based selection (e.g., "Say one if . . . "). In order to keep the number of language choices manageable, and the customer experience simple, the embodiment described offers only one generic version for each language. It does not offer multiple versions of Spanish, for example. The following ten languages are supported by the embodiment described, chosen based of highest frequency users of emergency cash: English, Cantonese Chinese, Spanish, Mandarin Chinese, Portuguese, French, German, Greek, Japanese, and Arabic. Other embodiments of the present invention support further languages and multiple versions of languages.

The customer 10 receives prompting to identify the customer's language and home bank using touch-tone keypad 74 from the IVR System, and does so 76. The IVR System 16 receives touch-tone (DTMF) signals identifying the caller's language and home bank 114, and places the caller on hold 116, 78.

Figure 5A:
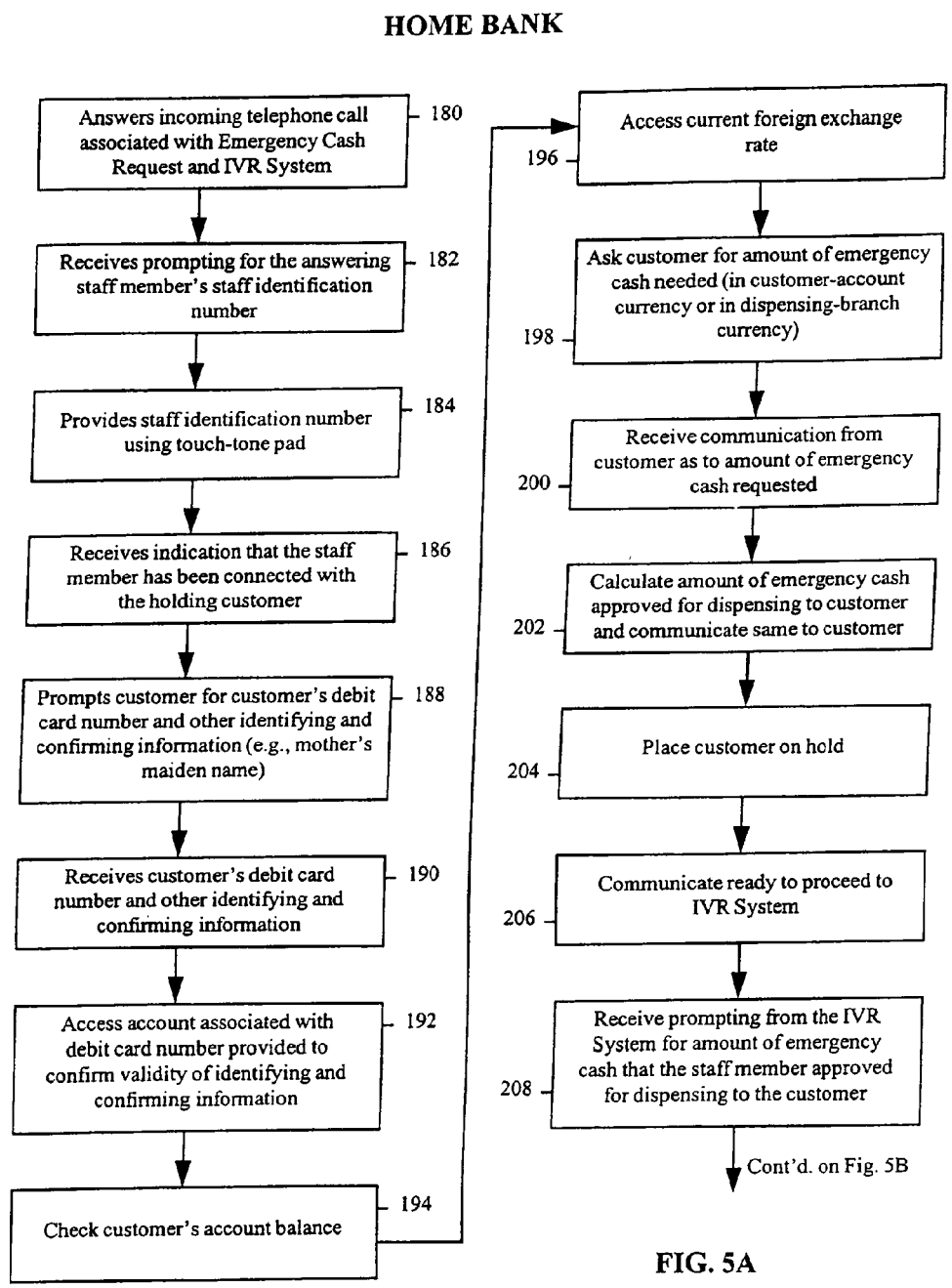
FIG. 5A is a sample processing flow diagram for a home bank and its staff for an embodiment of the present invention.
Figure 5B:
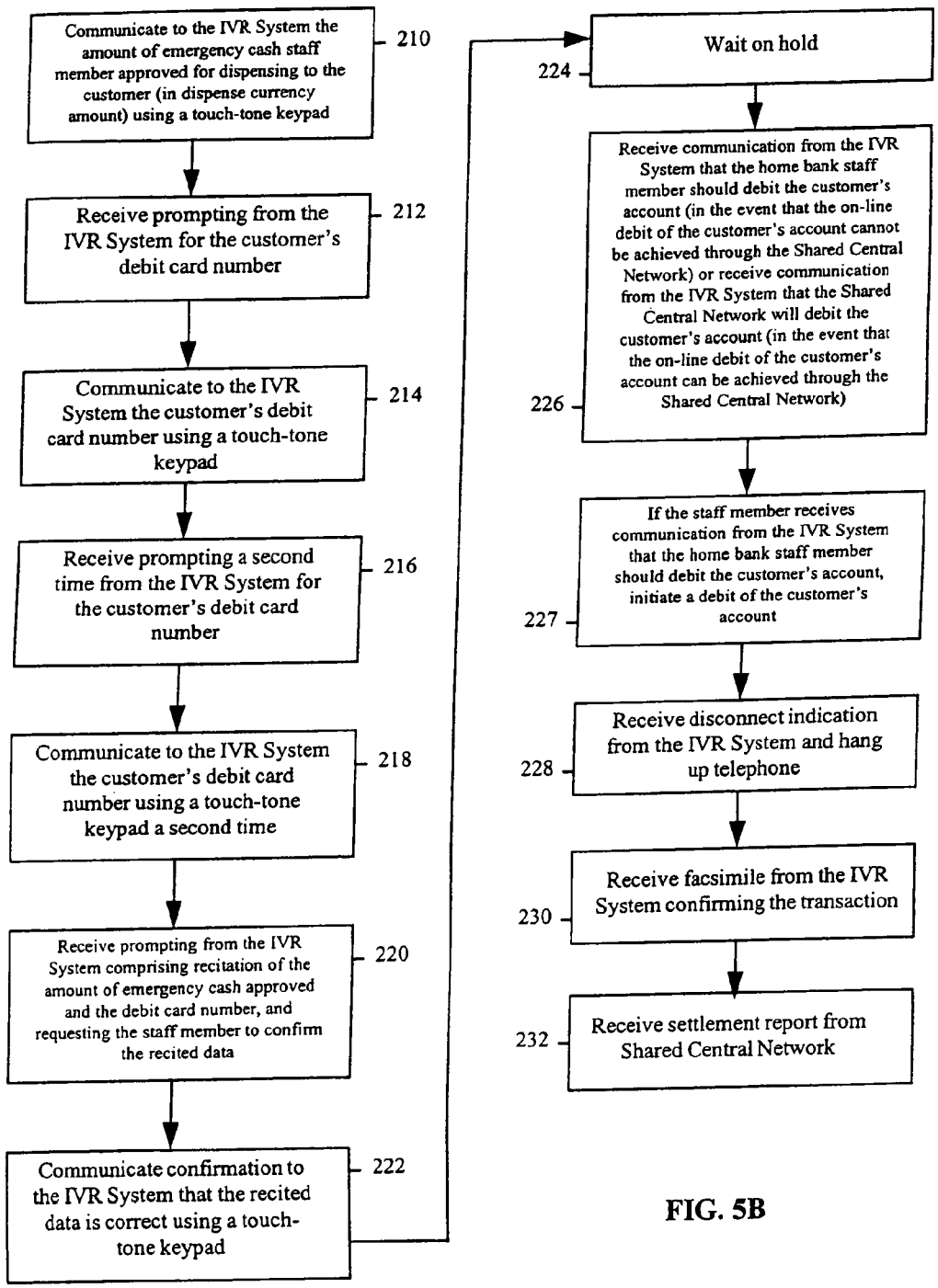
FIG. 5B is a continuation of the sample processing flow diagram of FIG. 5A.

The IVR System 16 stores telephone numbers associated with home banks in a database 17, and accesses that database to determine the correct telephone number to call. The IVR System 16 calls the home bank identified by the caller 118. Referring to FIG. 5A, staff member 20 of the home bank 21 answers the incoming telephone call associated with Emergency Cash Request and the IVR System 180. In one embodiment, the IVR System 16 accesses foreign exchange (FX) rates for the country from which the incoming call originated and the caller's home-bank country, and will supply the FX rate to the customer 10 using automated voice. In another embodiment, the IVR System 16 will supply the FX rate to the home bank using an automated voice 120. The system supports FX rate conversion for all currencies. The effective FX rate for each emergency-cash transaction is set via an on-line query to the Central Network 22 or to another supplier of current FX rates. Using on-line access to current FX rates, and setting the rate for an emergency-cash transaction, ensure that rates are the most current and protects against sudden currency volatility. Of course, the home bank may chose to use an IVR-type system to communicate automatically with the IVR System 16 in place of, or in addition to, the home-bank staff member 20.

Referring to FIG. 3A and FIG. 5A, after connecting with the home bank called, the IVR System 16 prompts the home-bank staff member 20 answering the call for the staff member's staff identification number 122. The staff member receives prompting for the answering staff member's staff identification number 182, and provides an identification number using a touch-tone pad 184. In one embodiment, the IVR System 16 will authenticate the staff member's identification number by comparing the number provided with a database of valid and expected numbers. After the IVR System 16 receives a valid staff identification number, the IVR System 16 connects (or bridges) the staff member 20 with the requesting customer 10 previously on hold at the foreign branch bank 124. The staff member 20 receives an indication that the staff member has been connected with the holding customer 186, and the holding customer receives an indication that the customer has been connected with a staff member of the customer's home bank 80. The IVR System waits while the home bank staff member 20 interacts with the customer 10 to receive indication from the home bank staff member that the staff member is ready to proceed further 126.

The home bank staff member 20 prompts the customer 10 for the customer's debit number and other identifying and confirming information (e.g., mother's maiden name) using the home-bank language 188. In other embodiments, the customer's credit card and credit card number may be used. The customer receives the prompt for the customer's debit card number and other identifying and confirming information (e.g., mother's maiden name) 82, and orally communicates the requested information to the staff member 84. In another embodiment, such information may be communicated by using a touch-tone keypad. The home bank staff member receives the customer's debit card number and other identifying and confirming information 190, and accesses the account associated with the debit card number provided (e.g., a savings account, checking account, or other account) to confirm validity of identifying and confirming information 192. After the information provided is confirmed, and the customer authenticated, the staff member checks the customer's account balance 194 and accesses the current foreign exchange rate 196.

The staff member 20 then asks the customer 10 for the amount of emergency cash needed (in customer-account currency or in dispensing-branch currency) 198. The customer receives the prompt for the amount of emergency cash needed 86, and communicates the amount of emergency cash needed (in customer-account currency or in dispensing-branch currency) 88. The system is designed to accommodate the customer's communication of cash needed in either home-bank currency or dispensing currency. The staff member receives the communication from the customer as to amount of emergency cash requested 200. The staff member can receive the request in customer-account currency or in dispensing-cash currency. The staff member has access to current foreign exchange rates, and can calculate or translate the currency amounts between the two standards for purposes of dispensing, determining whether the customer has a sufficient account balance, and other purposes.

In light of the customer's request, the staff member 20 calculates the amount of emergency cash approved for dispensing to customer 10, based on the customer's account balance, maximum daily withdrawal, and other factors, and communicate the amount approved to the customer 202. The customer receives communication of amount of emergency cash approved for dispensing to the customer 89, and is placed on hold by the staff member 90, 204.

The home bank staff member 20 communicates to the IVR System 16 that the staff member is ready to proceed 206. This may be done by inputting a pre-designated code using a touch-tone keypad. The IVR System 16 receives an indication that the home bank staff member is ready to proceed 127, and prompts the staff member 20 for amount of emergency cash that the staff member approved for dispensing to the customer 128. The staff member 20 receives the prompting from the IVR System 16 for amount of emergency cash that the staff member approved for dispensing to the customer 208, referring to FIG. 5B, and communicates to the IVR System 16 the amount of emergency cash the staff member 20 approved for dispensing to the customer 10 (in dispensing currency amount) using a touch-tone keypad 210. In this embodiment, the staff member 20 communicates the amount of approved currency in the dispensing currency amount. The IVR System 16 is capable of receiving the amount in the home-bank currency amount and calculating the corresponding dispensing currency amount based on the IVR System's access to current foreign exchange rates.

The IVR System 16 receives touch-tone signals indicating the amount of emergency cash that the staff member 20 approved for dispensing to the customer 130, and prompts the staff member a first time for the customer's debit card number 132. The staff member receives the prompting from the IVR System 16 for the customer's debit card number 212, and communicates it to the IVR System 16 using a touch-tone keypad 214. The IVR System 16 receives the touch-tone signals indicating the customer's debit card number 134, and prompts the staff member a second time for the customer's debit card number for confirmation 136. The staff member receives the second prompt 216 and communicates to the IVR System 16 the customer's debit card number using a touch-tone keypad a second time 218, which the IVR System receives 138. The IVR System 16 compares the touch-tone signals received in response to the first and second prompting for card number to confirm that the same number was entered each time 140. In another embodiment (not shown), the IVR System 16 compares the number received with a database to confirm that the number is a valid number.

If the same number was entered each time, the IVR System 16 prompts the staff member 20 with an automatic-voice recitation of the amount of emergency cash approved and card number, and asks the staff member to confirm the data 142, which the staff member receives 220. The staff member communicates confirmation to the IVR System 16 that the recited data is correct using a touch-tone keypad 222. Once the staff member indicates that the recited transaction is correct, the IVR System places the staff member on hold 144, 224.

The IVR System 16 next communicates to the previously-holding customer 10 that the customer should give the telephone back to the branch staff 146. The IVR System 16 does so in the language previously selected by the customer. The customer receives the communication that the customer should give the telephone back to the branch staff 92, does so 94, and waits while the branch staff communicates with IVR System 96. The foreign branch bank staff 12 receives the telephone back from the customer 42. The IVR System 16 communicates to the branch staff 12 that the home bank has approved dispensing the approved amount of currency (in dispensing currency amount) to the customer 44, 148. The IVR System 16 uses the designated language of the branch bank to do so. The IVR System 16 then requests the foreign branch staff's approval of the recited dispensing in the designated language of the branch bank country 46, 150. Next, the foreign branch bank staff member communicates the branch bank's approval of the recited dispensing to the IVR System using the touch-tone keypad of the telephone 48, which the IVR System receives 152.

Automatic on-line debit, e.g., automatic on-line debit of the customer's account, takes place in the embodiment shown once the IVR System 16 receives the approval 152. On-line debit includes the process of debiting the customer's account once the emergency-cash transaction has been approved. The system uses existing on-line messages sent to the issuer (e.g., issuer of the customer's debit card) front-end systems to accomplish on-line automatic debiting of emergency cash transactions. The front-end system 24 comprises a computer system or network that facilitates communication with the issuing business, e.g., with the issuing business's back-end system, which carries out the debiting and similar computational functions. For example, in conventional ATM systems, ATMs communicate with business front-ends to facilitate transactions.

An issuing business has a finance system which considers requested transactions, and authorizes or denies the transactions. The finance system communicates with the front-end system, which communicates with outside systems, including, for example, the Shared Central Network 22. The front-end system may communicate transaction requests to the finance system of the issuing business. In another embodiment, the transactions are communicated to the business back-end system, or host system, for processing and permanent record.

In the shown embodiment, the issuer is a business unit associated with the home bank. The issuer may be a home bank, third-party, or other issuing entity. In one embodiment, the home bank of the answering staff member 20 may be considered the issuer. Also, the acquirer may be any type of currency-dispensing entity, including a bank, travel agency, wire transfer entity, store, airline, consulate, transportation company, or other type of body that may dispense cash.

After approval 152, the IVR System 16 signals the Shared Central Network 22 to debit the appropriate account, which, in the embodiment shown, is the customer account associated with the customer's debit card number. In the embodiment shown, the IVR System 16 generates a cash-withdrawal message and sends it to a Shared Central Network 22. The IVR System 16 will normally be an acquirer from the Central Network's perspective. In one embodiment, the IVR System 16 is a Processor Interface (PI) in communication with the Central Network 22, and, in one embodiment, may be physically included within the Central Network 22. In another embodiment, the Shared Central Network 22 may be replaced with a computer or processor, shared or unshared, central or not central. The Network 22, in turn, forwards the message to the issuer front-end, which debits the customer's account. This scheme minimizes the impact to the front-end systems and works like a network ATM cash withdrawal. The Shared Central Network determines the issuer associated with the transaction indicated by the cash-withdrawal message as indicated by the debit card number of the customer indicated by the home branch staff.

Issuers (or businesses) that do not have a front-end system, and those that cannot accommodate the front-end changes necessary to interface with the IVR System 16 and/or Network 22 of the emergency cash system described herein, can still use, and/or become part of, the present invention and reap the benefits of automated business-to-business money movement and settlement using the invention. In one embodiment, the home bank staff 20 is instructed by the IVR System 16 to debit the customer's account in their 20 customary way (e.g., via their access terminals). This type of debiting is communicated to the IVR System 16 and Central Network 22. The transaction is still visible to the IVR System 16 and the Shared Network 22, and therefore such businesses can still benefit from the automation of funds movement and settlement.

With reference to FIG. 1 and FIG. 3B, after receiving indication of the foreign branch's approval 152, the IVR System initiates 154 an on-line debit of the customer's account by communicating the requisite debiting information (e.g., account number, debit amount) in the form of a cash withdrawal message to the Shared Central Network 22. On-line debit of the customer's account is implemented using ISO 8583 messages to the Central Network 22 and Front-end 24 using the X.25 messaging protocol. The use of ISO 8583 messaging is described further below.

Figure 6:
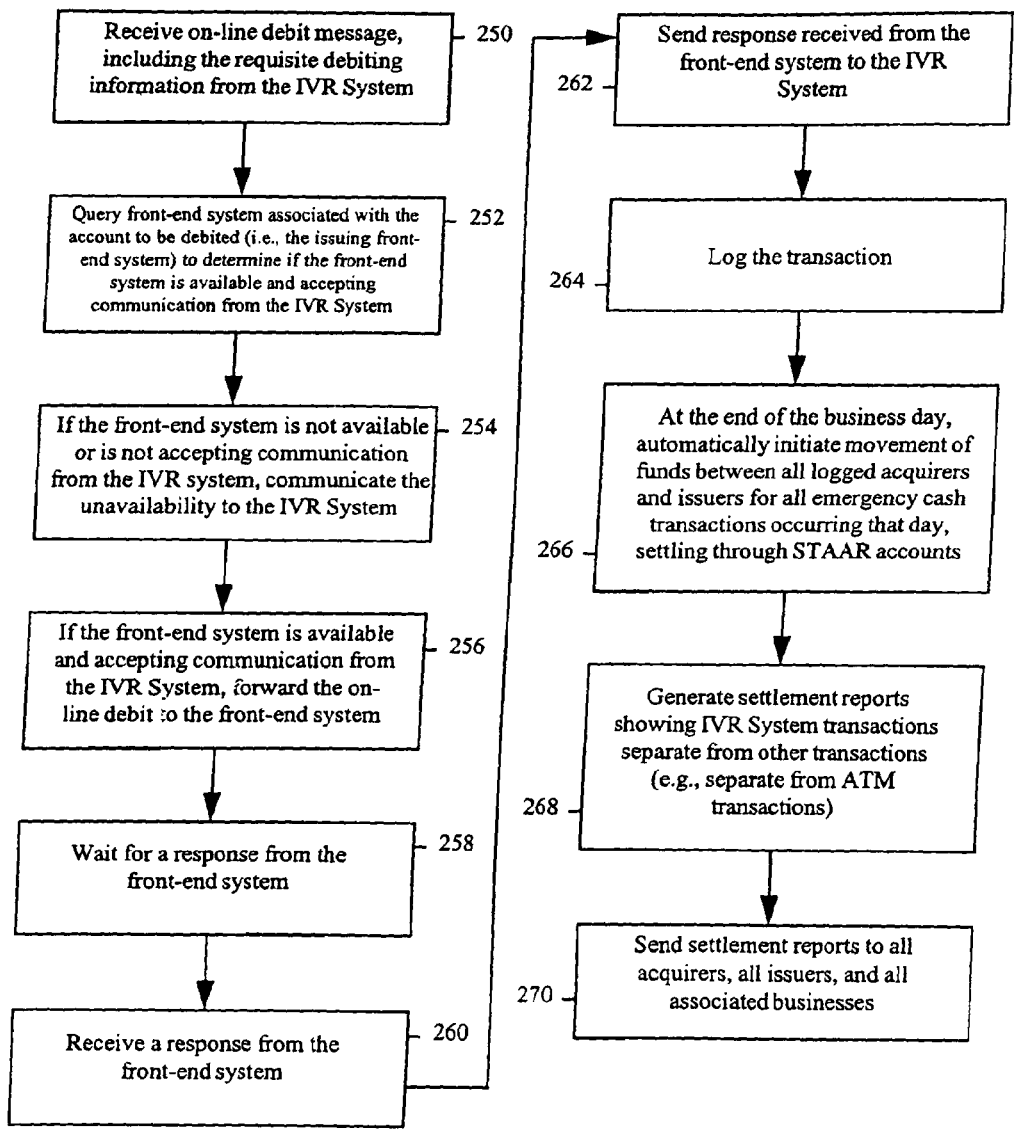
FIG. 6 is a sample processing flow diagram for a Shared Central Network for an embodiment of the present invention.

Referring to FIG. 6 and FIG. 3C, the Shared Central Network 22 receives the on-line debit message, including the requisite debiting information, from the IVR System 250. After the message is received, the Shared Central Network 22 queries the front-end system associated with the account to be debited (i.e., the issuing front-end system) 24 to determine if the front-end system 24 is available and accepting communication from the IVR System 252. The IVR System 16 waits while the Shared Central Network 22 determines if the issuing front-end system 24 is available and is accepting communication from the IVR System 156. The front-end system 24 communicates its availability to the Shared Central Network 22.

If the front-end system is not available or is not accepting communication from the IVR system 16, the Shared Central Network 22 communicates the unavailability to the IVR system 254. If the IVR System 16 receives communication from the Shared Central Network 22 that the on-line debit of the customer's account cannot be achieved through the Shared Central Network 22 due to the issuing front-end system's unavailability, the IVR System 16 communicates to the home bank staff member that the home bank staff member should debit the customer's account 160. The staff member receives telephonic communication from the IVR System that the home bank staff member should debit the customer's account 226, and initiates a debit of the customer's account 227. The IVR System logs the transaction in a database as complete 162, and disconnects all parties 164, 50, 228.

If the front-end system is available and accepting communication from the IVR System 16, the Shared Central Network 22 forwards the on-line debit message received from the IVR System to the front-end system 256 and waits for a response 258. The front-end system automatically initiates a debit of the customer's account and sends a confirming response to the Shared Central Network. The Shared Central Network receives a response from the front-end system 260, sends that response to the IVR System 262, and logs the transaction in a database 264. The IVR System receives the response forwarded by the Shared Central Network, and telephonically communicates to the home bank staff 20 via automatic voice that the Shared Central Network will debit the customer's account 158. The home bank staff member 20 receives communication from the IVR System that the Shared Central Network will debit the customer's account 226. The IVR System then logs the transaction in a database as complete 162, and disconnects all parties 164, 50, 228.

After the foreign branch staff member 12 receives a disconnection indication from IVR System 16 and hangs up the telephone 50, the staff member 12 asks the customer 10 to sign the Emergency Cash Request Form 52. Once the customer signs the form and returns it to the bank staff 54, 98, the foreign branch staff member 12 dispenses the recited currency to the customer and files the form 56, 100.

The IVR System 16 transmits a facsimile to the home bank 21 and to the branch bank 8 confirming the transaction 166. The home bank receives the facsimile from the IVR System confirming the transaction 230, as does the foreign branch bank 58. This confirmation may be sent by mail, e-mail, or other method as well. In addition, the IVR System periodically sends a summary to the home bank of all transactions completed using the IVR System by the customers of the home bank abroad 168. It also periodically sends a summary to the home bank of all transactions completed by the home bank for foreign customers 168.

The system also features automatic settlement. The settlement process between the issuing and acquiring businesses makes use of communication systems used by international ATM or debit card transactions globally. As shown in FIG. 1, the Shared Central Network 22 is in communication with the STAAR Accounts 26, which include a settlement account of the home bank business 24 and a settlement account of the foreign branch bank 8. Of course, the Home Bank Business (Issuer) 24 has access to, and is in communication with, the settlement account 26 associated with the home bank business, and the foreign branch bank 8 has access to, and is in communication with, the settlement account 26 associated with the foreign branch bank. Businesses, or issuers and acquirers, that wish to interface with, or become part of, the system described herein establish accounts, called international settlement accounts, or STAAR accounts, to facilitate international settlement. In an embodiment, the STAAR accounts of all participants in the system are maintained in one physical location. The STAAR account facilitates settlement between participating acquirers and issuers by debiting and crediting the STAAR accounts associated with the acquirer and issuer associated with each emergency-cash transaction carried out and recorded in the system as described herein.

In furtherance of the automatic settlement aspect of the present invention, the Shared Central Network 22 carries out a reconciled-statement function on behalf of all the businesses. For example, when a US home bank customer 10 in Japan 6 receives currency from the foreign branch bank 8, the customer 10 receives money belonging to the foreign branch bank 8, and the branch bank 8 must be reimbursed for servicing the US home bank customer in Japan. Thus, at the end of the day, the Shared Central Network 22 carries out the settlement of the transaction by crediting and debiting, as appropriate, the settlement accounts 26 associated with the US home bank issuer and the foreign branch in Japan.

As described above, and in further detail by way of example below, the Central Network 22 credits the amount owed to the foreign branch bank 8 to the settlement account associated with the foreign branch bank 8, and debits the amount owed to the settlement account associated with the home bank issuing business. In an embodiment, the STAAR accounts 26 and the Central Network 22 comprise a system used only by a home bank and its associated foreign branches to settle transactions between them. In an embodiment, the accounts 26 comprise a set of business accounts for the home bank and associated businesses, e.g., the home bank and associated foreign branches.

In an embodiment described herein, the acquirer will dispense only a single currency and settlement between businesses is in United States dollars. Embodiments may allow for dispensing of more than one currency by the acquirer and of settlement between businesses using other standards.

In an embodiment described herein, the Shared Central Network 22 records in its associated database 23 the data necessary for the network 22 to debit and credit the appropriate settlement accounts 26 in carrying out automatic settlement of the transactions recorded therein. The Shared Central Network 22 shown comprises a centralized clearinghouse system or centralized settlement system for settlement of transactions carried out through the IVR System 16. Such systems include systems having the software necessary to calculate credits and debits, access the database 23, and communicate with the appropriate settlement accounts 26. Other types of networks and communication means may be used to settle transactions within the present invention.

At the end of each business day, the Shared Central Network 22 automatically initiates movement of funds between all logged acquirers and issuers for all logged emergency cash transactions occurring that day, settling the debits through accounts, here comprising international settlement accounts called STAAR accounts 26. The Shared Central Network 22 accesses its database to determine all logged acquirers and issuers, and communicates with the settlement accounts 26 of the acquirers and issuers to complete settlement of that day's transactions.

For example, in the embodiment shown, the accounts 26 include a settlement account of the foreign branch bank 8 and a settlement account of the home bank business 24. If a home bank business customer received $400 from the foreign branch 8 during an emergency-cash transaction that day, the Shared Central Network 22 will have recorded the acquirer identification (the foreign branch bank identification), the issuer identification (the home bank business), and the amount of the transaction ($400). At the end of the day, assuming that the foreign branch had no other transactions relevant to the home bank business, the Shared Central Network 22 will debit the settlement account (STAAR account) of the home bank business in the amount of $400, and will credit the settlement account (STAAR account) of the foreign branch bank in the amount of $400 in settlement of the day's transactions.

As another example, if, in addition to the $400 transaction described above, a second home bank business customer received $600 from the foreign branch 8 during an emergency-cash transaction that day, the Shared Central Network 22 will have recorded the acquirer identification (the foreign branch bank identification), the issuer identification (the home bank business), and the amount of the transaction ($600), in addition to the transaction data related to the $400 transaction described above. At the end of the day, assuming that the foreign branch had no other transactions relevant to the home bank business, the Shared Central Network 22 will debit the settlement account (STAAR account) of the home bank business in the amount of $1000, and will credit the settlement account (STAAR account) of the foreign branch bank in the amount of $1000 in settlement of the day's transactions.

The foreign branch and the home bank business may have other transactions that day. If, for example, the home bank business provides cash (e.g., $350 in an ATM transaction or an emergency-cash transaction) to a customer of the foreign branch that same day as the $400 and $600 transactions described above, the Shared Central Network 22 will include the transaction in the automated settlement, and will debit the settlement account (STAAR account) of the home bank business in the amount of $650, and will credit the settlement account (STAAR account) of the foreign branch bank in the amount of $650 in settlement of that day's transactions.

Businesses participating in automated on-line account debit and settlement of the described embodiment have the following features. For automated settlement, businesses are connected to the Shared Network 22 and have a STAAR account for money movement. For automated on-line account debit, businesses have a front-end system in communication with the Network 22. Preferably, all businesses participating in the emergency cash program have front-end systems in communication with the Network 22. Automated on-line account debit is similar to a cash-withdrawal transaction and requires that the front-end system recognize a cash-withdrawal message from the Network 22. As discussed above, businesses may participate in emergency cash procedures without a front-end system, and their customer's account is debited through the home bank staff when facilitating an emergency cash transaction. In other words, the home bank staff is instructed by the IVR System to debit the customer's account in the customary way.

In one embodiment, the Shared Network 22 receives confirmation of settlement from the server(s) hosting the Accounts 26. The Shared Network 22 logs this confirmation of settlement in this database 23.

The Shared Central Network 22 generates settlement reports showing the IVR System transactions separate from other transactions (e.g., separate from ATM transactions) 268. As an example, in one embodiment, the system provides a separate settlement report for the acquiring entity broken out by a pseudo terminal value that the acquiring entity would associate with emergency cash transactions. On the issuing side of the emergency-cash system, reporting of settlement of such transactions is commingled with regular ATM transactions, and an additional identifier will be added to the reports to indicate the transaction was an emergency cash transaction.

The Shared Central Network 22 then sends the settlement reports to all acquirers, all issuers, and all associated businesses 270. The reports are received by, for example, the home bank 232 and the foreign branch bank 60 in the transaction described above.

Moreover, the Shared Central Network 22 stores in its database 23 information (or a transaction log) about each emergency-cash transaction carried out. Preferably, transaction information is kept for thirty-six months. The transaction-log data that is more than thirty-six months old is removed from the system and archived (data removal and archival may be subject to business or legal/regulatory requirements). This information may be stored in a database 17 associated with the IVR System 16 as well, or in the alternative.

Storage of emergency-cash transaction information in a database 23 facilitates management information system reports. The Shared Central Network 22 stores all available information about each emergency-cash transaction in its database 23. The Shared Central Network 22 includes a computer capable of managing the requisite data, calculating desired results, and providing reports (this data management and reporting function may be carried out in the IVR System 16 or in another location including a computer). The Network 22 reports global usage of emergency cash transactions using the transaction data stored in its database (comprising, e.g., acquirer identification, issuer identification, and amount of transaction). For example, the Network 22 stores the country code associated with each emergency cash transaction, and can generate a report setting out the number of transactions occurring in each country for a selected period of time. In another embodiment, the IVR System 16 carries out the above-described storing of transaction data in a database 17 associated with the IVR System and reporting global usage.

Also, in the shown embodiment, the IVR System 16 provides desired, complete data about emergency-cash transactions to participating home-bank-associated businesses on a regularly scheduled interval (e.g., monthly) in the form of a MIS report. This information is used to assist in inquiries or investigations in the event of disputes and to monitor the emergency cash activity globally. The MIS report includes the following information for each market or country: the number of transactions and dollar value by month and year to date, the average dollar value per transaction, and percentages for number of transactions and dollar values. The MIS report also includes a chart showing the number of transactions completed at each acquiring business mapped against the issuer business.

The Shared Central Network 22 also provides on-line access to operations to monitor and assist in inquiries or investigations. The Network 22 tracks all financial transactions, such as debits and settlement, regardless of the outcome (successful or failed), storing the information in its database 23, in order to evaluate the system's operational efficiency.

Other embodiments may be employed to comply with country requirements or practices. For example, if the home bank customer requests emergency cash from a foreign branch bank in Greece, the Emergency Cash Request Form will be faxed from Greece to the acquiring business or to the home bank. Also, a different number besides a debit card number may be used to identify the customer and the customer's account in, for example, Germany. The customer's ATM card number or other account or identifying number may be used.

Preferably, the emergency-cash system described is accessible from branch banks throughout the world 24-hours a day, seven days a week, each day of the year. Although constant operator support may not be needed, reasonable global operator-support of the system is necessary. Preferably, home bank staff members trained to assist emergency-cash calls are available 24-hours a day, seven days a week to answer calls from the IVR System and to interact with customers and foreign branch staff if necessary. Also, preferably, the system described is accessible via a primary international telephone number, as well as a back-up telephone number in the event the primary number is not functional. The system may employ international toll-free tariffs where available.

The system provides for maintenance and monitoring. From time to time, system maintenance and upgrades will be necessary. They are scheduled and broadcast in advance to avoid negatively impacting the system and its availability. An operator interface (not shown) to the IVR System 16 and other parts of the system is provided to monitor system activity and to monitor calls. The monitoring operator can assure that the system is functioning properly.

The system also provides for security and audit. The IVR System 16, Shared Central Network 22, and related databases 17, 23 and other hardware are kept in physically secure facilities. Those who have access to the emergency cash system comprising the IVR System, Shared Central Network, and related databases are required to enter a log-on identification and a password. An audit trail of all activities of the authorized operator is recorded in a database. An audit trail includes a record of all activities carried out within the system, the time at which such activities were carried out, and the log-on identification of the operator carrying out such activities.

Likewise, branch bank and home bank personnel with access to the system must input at least a log-on identification, and in an embodiment, both a log-on identification and a password. Audit trails of such personnel who conduct activities within the emergency cash system are recorded in a database.

Also, an audit trail of all customer transactions, both successful and failed, is recorded in a database 17. The audit trail of such customer transactions includes the identifying identification number of the staff member who assisted, or attempted to assist, the customer.

Moreover, an embodiment of the invention includes a unique identification number for all persons authorized to access the system. An embodiment also includes a unique identification number associated with all transaction points and logs carried out in the system. Such identification numbers are capable of identification and tracing.

An embodiment of the emergency cash system including the present invention provides for a substantial degree of automation in emergency cash situations, and compensating controls are introduced at the system level to mitigate risks of security breaches, fraud, and similar matters. In an embodiment, key steps in the process, such as customer identification and authorization to give cash, are carried out by staff, and operational and process security controls are inserted to maintain security, and to guard against fraud and theft. For example, in an embodiment emergency cash transactions carried out through the emergency cash system are subjected to transaction and daily amount limits.

An embodiment of the present invention provides for separating operation of the emergency cash system from home-bank operation, home-bank business unit operation, and/or issuer operation. For example, in an embodiment of the present invention, separate personnel are employed to operate the emergency cash system. In an embodiment, tasks carried out by emergency-cash-system staff-members include operating and maintaining the emergency cash system, executing requests to enroll and update business information (e.g. telephone numbers), providing MIS information required for investigations, and notifying users of down time and system upgrades.

Businesses include business divisions, including debit-card issuing divisions, within the home bank. In other embodiments, businesses include third-party debit-card and ATM card issuers and other third-party businesses. The tasks carried out by business staff members include providing timely and accurate information relative to information kept on the emergency cash system's database(s), using the emergency cash system as the primary system, or system of choice, for emergency cash transactions, providing staff training to ensure proper and efficient usage of emergency cash system resources, and similar functions. Moreover, in an embodiment of the invention, businesses participating in the emergency cash system provide phrases and suggested phrases for professional voice recordings and inclusion in the IVR System 16 scripts.

An embodiment of the present invention includes back-up systems. Back-up systems include maintaining the operation and existence of manual emergency cash procedures to use in the event the primary, automated emergency cash procedures and system are unavailable.

In an embodiment of the present invention, the IVR System 16 runs on Microsoft's NT 4.0 operating system and includes higher-density telephone boards. Preprogrammed language scripts are stored in a database associated with the IVR System 16. The system uses Microsoft's Visual Basic 5.0 and Microsoft Access generic application development software packages. Third-party vendor Pronexus' VBVoice and VBFax interactive voice response application generation software is used for voice and fax session handling.

In an embodiment of the present invention, the IVR System 16 is a personal computer (PC), including at least 132 MB RAM, a 160 MHZ Pentium processor, two twelve-channel PIKA Voice cards, one 2-channel fax card, one UPS, one CD player, and one tape backup device. An embodiment includes at least 24-line capacity for incoming and outgoing calls, and at least enough lines to provide a minimum 95% availability rate during the busiest hours of operation of the system. T1 lines are preferable, and an analog POT (plain old telephone) system may be employed in an embodiment.

Indeed, the IVR System 16 and the Network 22, and front-end 24 may be processors or computers capable of carrying out the steps and functions described herein. For example, they may be PCs, main-frame computers, or other, similar type of hardware including a processor.

An embodiment of the invention requires telephone equipment at two ends of the transaction: foreign branch bank and home bank. On the foreign branch bank end, the equipment needed is a touch-tone telephone (speaker optional), a facsimile machine, and the ability to handle international calls on both the touch-tone telephone and the facsimile machine. On the home bank side, it is preferred that a dedicated line be made available for incoming IVR System 16 calls associated with emergency cash. The dedicated line is separate from lines dedicated to regular home bank inbound calls. In the preferred embodiment, incoming IVR System 16 calls are not directed to ACD (automated call distributor) systems. Additionally, a fax machine is present at the home bank for transaction confirmation purposes.

The embodiment shown employs ISO8583 messaging for communication between the IVR System 16, the Shared Central Network 22, and the front-end system(s) 24. Such messaging is used for authorization and other messages. Persons of ordinary skill in the art are familiar with ISO8583 messaging as used in, for example, ATM transactions.

In an embodiment, all ISO messages generated by the IVR System 16 in relation to the emergency-cash procedure contain a pre-designated string in the S-104 (Transaction Description) field. For example, in the embodiment shown, the pre-designated string is "CGEC" (Citibank Global Emergency Cash). In one embodiment, this field is passed to the country hosts for statement and rendition processing. In the embodiment shown, the "CGEC" string is the only element in the fields differing from a conventional ATM withdrawal. In other embodiments, other field elements may be altered.

Figure 7:
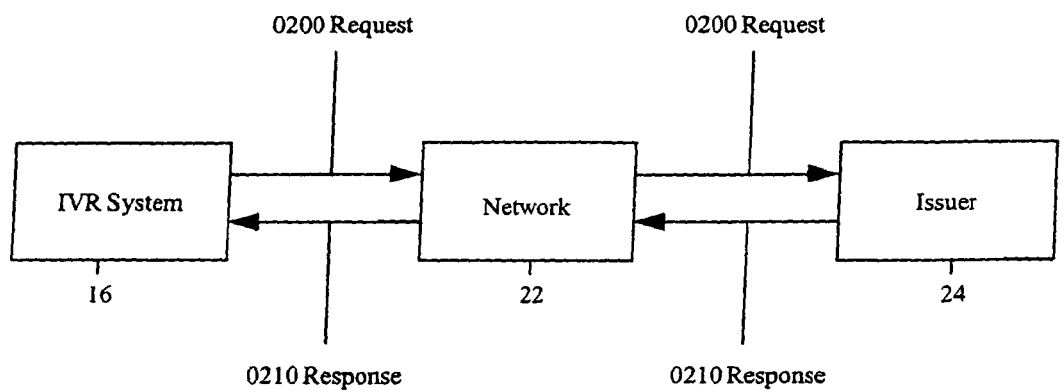
FIG. 7 is an overview block diagram of sample messaging flow among an IVR System, Shared Central Network, and Issuing Business Entity of a Home Bank for an embodiment of the present invention.

Referring to FIG. 7, the emergency-cash system shown, including the IVR System 16, uses the ATM cash withdrawal message (0200) flow to obtain authorization and to debit the customer's account. FIG. 7 shows the flow of a request (0200) and a response (0210). The corresponding reversal message is used to backout a transaction if required.

The messaging used in the present invention is like that used in ATM transactions. For example, in an embodiment, the customer 10 is given the option to decline the transaction based on the (0210) system's response to the customer's request. At this point, the customer 10 knows exactly how much their account will be debited upon completing the requested transaction. One situation in which the customer 10 may wish to decline the transaction is if the customer 10 asks for a given amount of emergency cash in dispensing-currency units while not realizing the amount of home-bank currency, or customer-account currency, that the dispensing amount comprises. The customer 10 may realize that the customer 10 has requested too much currency. If the customer 10 declines the transaction, the IVR System 16 will send a 0420 Reversal to the Central Network 22. The Central Network 22 routes the 0420 Reversal message to the issuing institution 24 in an "infinite re-try" mode.

As another example, the system provides for messaging in the event a FEP (front-end processor) is not working. In the shown embodiment, if the link between a front-end 24 and the Central Network 22 is not working, or the front-end 24 is otherwise not communicating with the Central Network 22 and the IVR System 16, the Central Network 22 returns a response code of '91' to the IVR System 16. As described above, in such an event, the IVR System communicates to the home bank staff member 20 that the home bank staff member 20 should debit the customer's account 160. The staff member 20 receives telephonic, automated-voice communication from the IVR System 16 that the home bank staff member 20 should debit the customer's account 226, and initiates a debit of the customer's account 227.

As a further example, the system provides for handling of unauthorized transactions. In the shown embodiment, any response code other than '00' signals that the transaction has not been authorized by the issuing institution. Based on the rejection code, the transaction would have to be completed manually, or redone (e.g., if a response code for "Insufficient funds" is returned, a transaction could be completed for a lesser amount).

FIGS. 8-14 show the ISO messaging scheme of the system embodiment discussed herein. Other messaging schemes may be used, and the information shown in FIGS. 8-14 comprises examples of schemes that may be used.

Only a limited set of ISO messages is generated by the IVR System 16 that are expected to reach the issuing front-end system 24. Since the IVR System 16 shown handles only emergency-cash situations, only cash-withdrawal messages are generated. In the embodiment shown, the other ISO messages generated by the IVR System 16, such as Administrative (800) or Format Errors (620), do not go to the front-ends 24 when sent by the IVR System 16. FIG. 8 shows ISO messages generated by the IVR System 16. The table in FIG. 8 shows message set indicators, message descriptions, and information regarding the message.

In the embodiment shown, the IVR System 16 generates certain messages, communicates them to the Central Network 22, and these messages are communicated to a front-end system 24 by the Network 22. In another embodiment, the same or similar messages may be generated by the Central Network 22 in response to communication from the IVR System 16.

FIGS. 9-12 show system message fields obtained by the IVR System 16. The table identifies ISO fields and describes how values are obtained by the IVR System 16. FIGS. 9A, 9B, and 9C show information related to the 0200 Financial Transaction Request. The 0200 message comprises generally the basic ATM cash withdrawal message. FIGS. 10A, 10B, and 10C show information related to the 0210 Financial Transaction Response, comprising a response sent to the Central Network 22 by a front-end system 24 in response to a 0200 Financial Transaction Request message received by the front-end system 24.

FIGS. 11A and 11B show a 0420 Acquirer Reversal Advice message. The 0420 message is a force-post message from the IVR System 16 to a front-end 24 passed-through to the front-end 24 by the Central Network 22. The 0420 message is generated by the IVR System 16 whenever certain conditions exist. Those conditions include communication problems, customer decline, or inability to confirm currency receipt by the customer (e.g., when phone-line problems arise and the IVR System 16 cannot confirm whether the customer received the currency that the IVR System 16 approved). FIG. 12 shows a related 0430 Acquirer Reversal Response message, generated in response to an 0420 message.

FIG. 13 shows sample content of an ISO 0200 message. The table shows the ISO8583 element, the source, the source location, the template, variable length information, and hypothetical message content from the UK. It is given as an example. Referring to FIG. 13, if the bit is not listed in the left-most column ("ISO Element"), then the bit is not required by the template used by the home bank or the foreign branch bank shown system, in this case the USA home bank and the UK branch bank. Abbreviations used in the table are as follows: RC-O (indicates that the data is optional, and is a function of the template(s) used in an embodiment); RC-M (indicates that the value is mandatory in the shown embodiment, and is a function of the template(s) used); RC-Dbase Value (indicates that the value is expected to be available from the IVR System database 17 in relation to "client" information); RC-System Gen (indicates that the value will be generated by a IVR System 16 application); and ISO VENDOR-Calculated (indicates that the value is provided by an ISO vendor, a third-party provider of ISO messaging tools for the IVR System 16 shown).

FIGS. 14A, 14B, 14C, and 14D show a table of response code definitions comprising expected response codes (P-39) for particular messages. Error response codes returned from the front-end(s) 24 will impact customer flow such as requesting card number re-entry or dispensing-amount re-entry. The front-ends 24 will limit the error response codes returned to the IVR System 16 due to the emergency nature and the pre-approval processing by the home bank staff 20. An example of error response codes reduction is that the front-ends will not check for stolen cards based on the secondary element 104 (S-104) containing "CGEC." The IVR System 16 is designed to handle any response code returned by the front-end systems in the event they are returned.

Essentially, all non-zero response codes are handled as a transaction rejection except where noted (e.g., insufficient funds). FIGS. 14A, 14B, 14C, and 14D show a listing of the Response Codes, including Cash Withdrawal Response (210) Response Codes and Cash Withdrawal Reversal Reason Codes.

In the case of a "generic reject" based on the Response Codes received by the IVR System 16, the IVR System 16 will not give the Response Codes or the reason for the rejection to the home bank staff members 20 or the foreign branch staff members 12. The IVR System 16 will attempt to obtain an on-line authorization where possible for certain Response Codes indicated below, and for all other Response Codes, the request will be declined (overruling the home bank staff member 20).

The front-end system 24 may be configured in a variety of ways. If a debit card has been reported as lost or stolen, the Emergency Cash Product Code, "CGEC," provided by the Central Network 22 in ISO Element S-104 is used as a flat to "by-pass" the status check process by the business FEPs (front-end processors) and hosts. The risk of fraud or loss is lessened, as the home bank staff member 20 has in effect authorized the debit prior to the IVR System 16 sending the debiting information on-line to cause the on-line debit.

Security features are employed by the emergency cash system. For example, a static-key encryption between the Central Network 22 and the IVR System may be used. The ANSI 9.8 encryption algorithm is one example of encryption means that may be used. Another example, is that the front-end system(s) check for emergency cash withdrawal amount limits. In the embodiment shown, limits of US $1,000 and US $2,000 for two levels of debit card customers are used, but any amount may be set, and they may be altered. Also, the Central Network 22 will hold a copy of an outbound message in a database for at least one hour.

Moreover, in the shown embodiment, a dummy PIN is used by the IVR System 16 in carrying out emergency cash transactions by using a dummy PIN to fill the data communication space in which the Central Network 22 and the front-end system of the issuing business 24 expect to receive a PIN number. The transaction embodiment described in detail herein is a "PIN-less" transaction. That is, in the usual application thereof, the customer 10 has lost the customer's debit card, and the customer has been identified and validated by the home bank staff 20 by asking, for example, the customer's mother's maiden name. Such a "PIN-less" transaction avoids having the customer input the customer's PIN number over the telephone. Such avoidance improves security for the customer's account.

Embodiments according to the present invention also provide for stand-in processing. In stand-in processing, one system is given the authority to authorize a transaction without getting an explicit approval or acknowledgment from the relevant host system. For example, in one embodiment, the Shared Central Network 22 is given stand-in processing authority by the issuer associated with the front-end 24. The Network 22 is given authority by the issuer to authorize transactions up to a certain currency amount, e.g., $400, if the Network 22 is unable to communicate with the front-end 24. After the Shared Network 22 receives debit information from the IVR system 16, and discovers that it cannot communicate with the front-end, if the debit or transaction request is less than $400, the Network 22 approves the transaction, allowing the process of dispensing currency to the customer 10 to proceed. The Network 22 stores the transaction data in its associated database 23 and communicates the transaction at a later time to the front end 24. In another embodiment, the IVR System 16 performs the stand-in processing, rather than the Central Network 22. Essentially, the IVR System 16, Central Network 22, or other system or staff member "stands in" the place of the issuer for authorization purposes for a limited, defined transaction set.

The embodiment shown describes a system and method in which banks in two countries, the United States and Japan, participate. Moreover, it describes the accounts 26 as including two settlement accounts, one for the foreign branch bank in Japan and one for the home bank business in the United States. Those of ordinary skill in the art will recognize that the system and method may include multiple banks in many countries as participants, and that the accounts 26 may include more than two settlement accounts, e.g., one for each participating business or bank.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method comprising:
   receiving, by an interactive voice response computer, a request from a caller at a currency-dispensing entity for the financial transaction by a caller's bank comprising dispensing of a currency by the currency-dispensing entity to the caller;
   identifying, by the interactive voice response computer, the caller by receiving and confirming touch-tone signals input by the caller to the interactive voice response computer;
   calculating, by the interactive voice response computer, an amount of a currency associated with the caller to be approved for dispensing to the caller by the caller's bank based at least in part on a current rate of exchange between the currency associated with the caller and a requested currency associated with the currency-dispensing entity;
   in response to receiving by the interactive voice response computer in real time a stand-in authorization message from a central network configured to generate the stand-in authorization message without an approval from the caller's bank, the authorization message indicating an approval for dispensing the amount of currency associated with the caller:
   communicating, by the interactive voice response computer in real time, to the currency-dispensing entity one or more messages, wherein the one or more messages include the amount of currency approved for dispensing to the caller in the requested currency associated with the currency-dispensing entity, and wherein the one or more messages include an indication that the amount of currency approved for dispensing is a special emergency currency approved by the caller's bank; and
   automatically initiating, by the interactive voice response computer, a settlement of the financial transaction comprising communicating an approval by the currency-dispensing entity of the financial transaction to the caller's bank, and debiting of a caller's account in the currency associated with the caller, and crediting an account of the caller in the requested currency associated with the currency-dispensing entity.

2. The method of claim 1, further comprising receiving an identification of the currency-dispensing entity.

3. The method of claim 1, further comprising receiving an identification of a caller language and thereafter prompting the caller in the identified language.

4. The method of claim 1, further comprising receiving an identification of the caller and the caller's bank.

5. The method of claim 1, further comprising bridging the caller to the caller's bank.

6. The method of claim 1, wherein calculating the amount of currency to be approved for dispensing to the caller further comprises calculating the amount of currency based at least in part on a check of the caller's account balance.

7. The method of claim 1, wherein automatically initiating the debit of the account of the caller comprises automatic communication with the account of the caller.

8. The method of claim 7, wherein automatically initiating the debit of the caller's account further comprises communicating with an issuer.

9. The method of claim 8, wherein automatically initiating the debit of the caller's account further comprises forwarding a debit message to the issuer.

10. The method of claim 9, wherein forwarding the debit message to the issuer further comprises forwarding the debit message to a business unit of the caller's bank.

11. The method of claim 10, wherein forwarding the debit message to the business unit of the caller's bank further comprises forwarding a cash withdrawal message to the business unit of the caller's bank.

* * * * *